US007657094B2

(12) United States Patent
Lin et al.

(10) Patent No.: US 7,657,094 B2
(45) Date of Patent: Feb. 2, 2010

(54) HANDWRITING RECOGNITION TRAINING AND SYNTHESIS

(75) Inventors: Zhouchen Lin, Beijing (CN); Liang Wan, Shatin (CN); Chun-Hui Hu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 11/321,493

(22) Filed: Dec. 29, 2005

(65) Prior Publication Data

US 2007/0154094 A1 Jul. 5, 2007

(51) Int. Cl.
*G06K 9/00* (2006.01)
(52) U.S. Cl. .................................. 382/187; 382/186
(58) Field of Classification Search ................ 382/159, 382/181, 186–187, 254, 309, 200, 206
See application file for complete search history.

(56) References Cited

U.S. PATENT DOCUMENTS

| 4,024,500 | A | | 5/1977 | Herbst et al. | |
|---|---|---|---|---|---|
| 5,048,097 | A | * | 9/1991 | Gaborski et al. | 382/156 |
| 5,812,698 | A | * | 9/1998 | Platt et al. | 382/186 |
| 5,850,477 | A | * | 12/1998 | Takada | 382/186 |
| 6,175,651 | B1 | | 1/2001 | Ikebata et al. | |

FOREIGN PATENT DOCUMENTS

JP       8-50632       2/1996

OTHER PUBLICATIONS

L. Yang, B.K. Widjaja, R. Prasad, "Application of Hidden Markov Models for Signature Verification," Pergamon, The Journal of the Pattern Recognition Society, vol. 28, No. 2, pp. 161-170 (1995).
Jaeyeon Lee, Ho-Sub Yoon, Jung Soh, Byung Tae Chun, Yun Koo Chung, "Using Geometric Extrema for Segment-to Segment Characteristics Comparison in Online Signature Verification," Pergamon, The Journal of the Pattern Recognition Society, vol. 37, pp. 93-103 (2004).
Kai Huang, Hong Yan, "Stability and Style-Variation Modeling for Online Signature Verification," Pergamon, The Journal of the Pattern Recognition Society, vol. 36, pp. 2253-2270 (2003).

(Continued)

*Primary Examiner*—Daniel G Mariam
(74) *Attorney, Agent, or Firm*—Lee & Hayes, PLLC

(57) ABSTRACT

Methods and systems for converting text into natural personal handwriting are provided. One aspect relates to the training of a computer to recognize a user's handwriting style. In one embodiment, the computer receives handwriting samples of at least one character written by the user, such as the character being provided as the beginning, middle, or ending character among a plurality of other characters. Further embodiments allow for increased personalization of the handwriting. Another aspect relates to system and methods for displaying a representation of a computer user's handwriting. In one embodiment, the handwriting comprises variant shapes of letters, personalized connection style between letters, and connection parts that look pressure-sensitive. In another embodiment, characters are adjusted, such as cutting portions of the character to create a more realistic recreation and synthesis of the handwriting.

20 Claims, 10 Drawing Sheets

OTHER PUBLICATIONS

Lawrence R. Rabiner, "A Tutorial on Hiddne Markov Models and Selected Applications in Speech Recognition," Proceedings of the IEEE, vol. 77, No. 2, Feb. 1989.

Daigo Muramatsu, Takashi Matsumoto, "An HMM On-line Signature Verifier Incorporating Signature Trajectories," IEEE Computer Society, pp. 438-442 (2003).

K. Tanabe, M. Yoshihara, H. Kameya, S. Mori, S. Omata, T. Ito, "Automatic Signature Verification Based on the Dynamic Feature of Pressure," IEEE, pp. 1045-1049 (2001).

Luan L. Lee, Toby Berger, "Reliable On-line Human Signature Verification System for Point-of-Sales Applications," IEEE, pp. 19-23 (1994).

R.S. Kashi, J. Hu, W.L. Nelson, W. Turin, "On-line Handwritten Signature Verification Using Hidden Markov Model Features," IEEE, pp. 253-257 (1997).

Ronny Martens, Luc Claesen, "On-line Signature Verification by Dynamic Time-Warping," IEEE, pp. 38-42 (1996).

Mingfu Zou, Jianjun Tong, Changping Liu, Zhengliang Lou, "On-line Signature Verification Using Local Shape Analysis," IEEE Computer Society, 5 pages (2003).

Jeff A Bilmes, "A Gentle Tutorial of the EM Algorithm and its Application to Parameter Estimation for Gaussian Mixture and Hidden Markov Models, International Computer Science Institute," pp. 1-13 (Apr. 1998).

Jack Sklansky, Victor Gonzalez, "Fast Polygonal Approximation of Digitized Curves," The Journal of the Pattern Recognition Society, vol. 12, pp. 327-331 (Jan. 1980).

Gopal Gupta, Alan Mccabe, "A Review of Dynamic Handwritten Signature Verification," Department of Computer Science, James Cook University, Townsville, Qld 4811, Australia, pp. 1-54 (Sep. 1997).

Mohammad M. Shafiei, Hamid R. Rabiee, "A New On-line Signature Verification Algorithm Using Variable Length Segmentation and Hidden Markov Models," IEEE Computer Society, 4 pages (2003).

\* cited by examiner

HANDWRITING RECOGNITION TRAINING AND SYNTHESIS

BACKGROUND

Personalization of computing environments has become increasingly popular. In addition to the vast array of software packages with similar functionalities for users to select, users may personalize settings within those software packages. For example, users of Microsoft® Windows® operating system may personalize their wallpaper and audio sounds, among other features of the operating system. While adjusting such features increases the personal experience for the user, allowing a user to recreate their own handwriting within a computing environment may be one of the means that most distinguish and personalize one user from another. Moreover, unlike some private settings, a user may be interested in sharing his/her handwriting if his/her emails or other documents could be written in personalized handwriting.

Generally, two kinds of approaches to generate or mimic handwriting have been attempted: direct handwriting capturing, and personal font design. Direct capturing collects the handwriting in digital form and reconstructs the handwriting on the receiver's computer using the recorded stroke point positions, pressure and brush style, or may simply send the images of the handwriting to the receiver. This approach is often utilized in Tablet PCs. Unfortunately, the user is required to write directly on the screen using a digital pen and tasks requiring large amounts of writing, such as preparing lengthy emails, may be inconvenient and tedious.

Personal font design makes a set of handwritten characters into a system font, for example, a true-type font. However, the personal font does not produce variation in character shapes that handwriting is supposed to have. Moreover, natural cursive handwriting cannot be generated, because the characters in system font are just rendered side by side.

Therefore, there exists a need in the art to allow a computer user to readily and effectively train a computer to recognize his/her handwriting without requiring time-intensive writing exercises, such as those associated with direct capturing. A further need exists for systems and methods to capture more characteristics from a sample than the shape of the individual characters, such as with personal font design systems. These and other needs are met with one or more aspects of the invention.

SUMMARY

Aspects of the invention relate to methods and systems for training a computer to recognize a user's handwriting. In one example, a computer receives handwriting samples of at least one character written by the user. The samples may include the character being provided as the beginning character of a word, the character being provided in the middle of a word, and the character being provided as the ending character of a word. Control points may be extracted from the samples to represent the shape of the character. In still yet further examples, the vertical and horizontal alignment of the characters are determined.

Another aspect relates to system and methods for displaying a representation of a computer user's handwriting. In one example, different variations of the same character, such as those described above, may be used depending one the particular usage of that character. In yet another example, methods may determine whether at least two characters received in the user input should be joined, even if the characters are part of the same word or string of characters. In yet further examples, characters are adjusted, such as cutting portions of the character to create a more realistic recreation and synthesis. In still yet another example, the characters are normalized before being displayed. In one such example, the normalization adjusts the character's aesthetic characteristics.

According to specific examples of the invention, characters are generated that accurately represent the handwriting, including variant shapes of letters, natural, reasonable and personalized connection style between letters, and connection parts that look pressure-sensitive.

These and other advantages will become apparent from the following detailed description when taken in conjunction with the drawings, A more complete understanding of the present invention and the advantages thereof may be acquired by referring to the following description in consideration of the accompanying drawings, in which like reference numbers indicate like features, and wherein:

DETAILED DESCRIPTION

Exemplary Operating Environment

Figure 1:
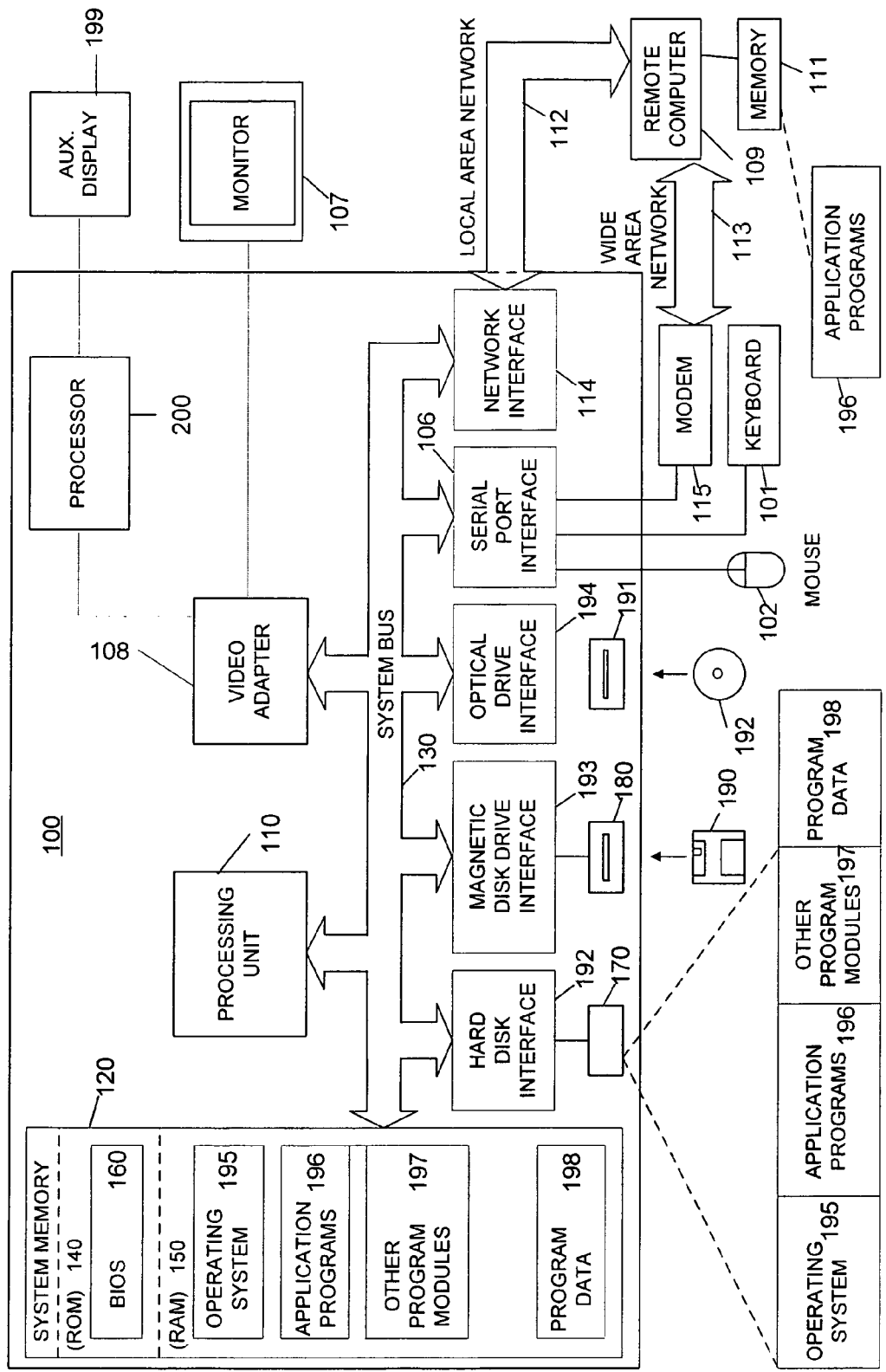
FIG. 1 illustrates an exemplary computer system in which embodiments of the invention may be implemented.

FIG. 1 is a functional block diagram of an example of a conventional general-purpose digital computing environment that can be used in connection with the methods and systems of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. An auxiliary display device 199 may also be in communication with computer 100. The auxiliary device may be integrated within the computer (as shown), detachable, or external. The auxiliary display device 199 may optionally be in communication with an auxiliary processor 200, which may be integrated within the auxiliary display or housed within the computer 100. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
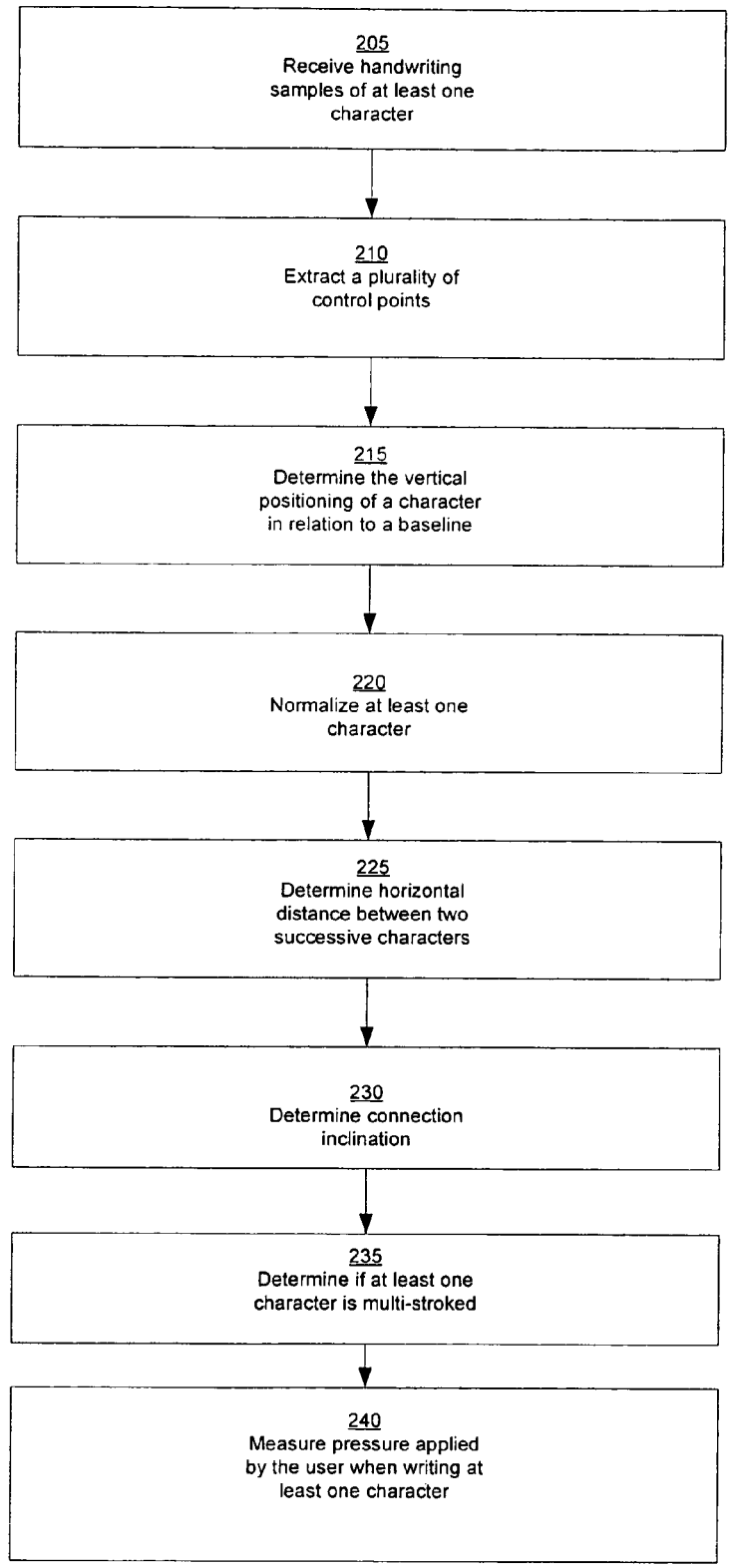
FIG. 2 illustrates a functional block diagram of one method for training a computer to recognize a user's handwriting.

FIG. 2 illustrates a functional block diagram of one method of training a computer to recognize a computer user's handwriting. In one embodiment, the computer may be arranged similar to computer 100. In step 205, the computer, such as computer 100, receives handwriting samples of at least one character written by the user. The handwriting samples may be received through any user input device, such as for example, a writing utensil, a heat sensitive surface, a pressure sensitive surface and combinations thereof. In yet another embodiment, the user may "select" a character or representation thereof previously stored on a computer-readable medium to serve as one or more samples. In yet another embodiment, the user may "draw" the character by moving a mouse, trackball, or other user input device over a surface.

As used herein, the term "character" may refer to any letter, number, graphical icon, or alphanumeric representation in any language including spoken, written, or utilized for programming computing devices. Indeed, any shape or design that may be received at a computing device through a user interface is a character within the scope of the invention. The samples comprise at least one sample of a character as being provided as the beginning character among a plurality of other characters, at least one sample of the same character being provided as the character as being written in the middle of a plurality of other characters, and at least one sample of the same character being provided as written as the ending character among a plurality of characters.

Figure 3:
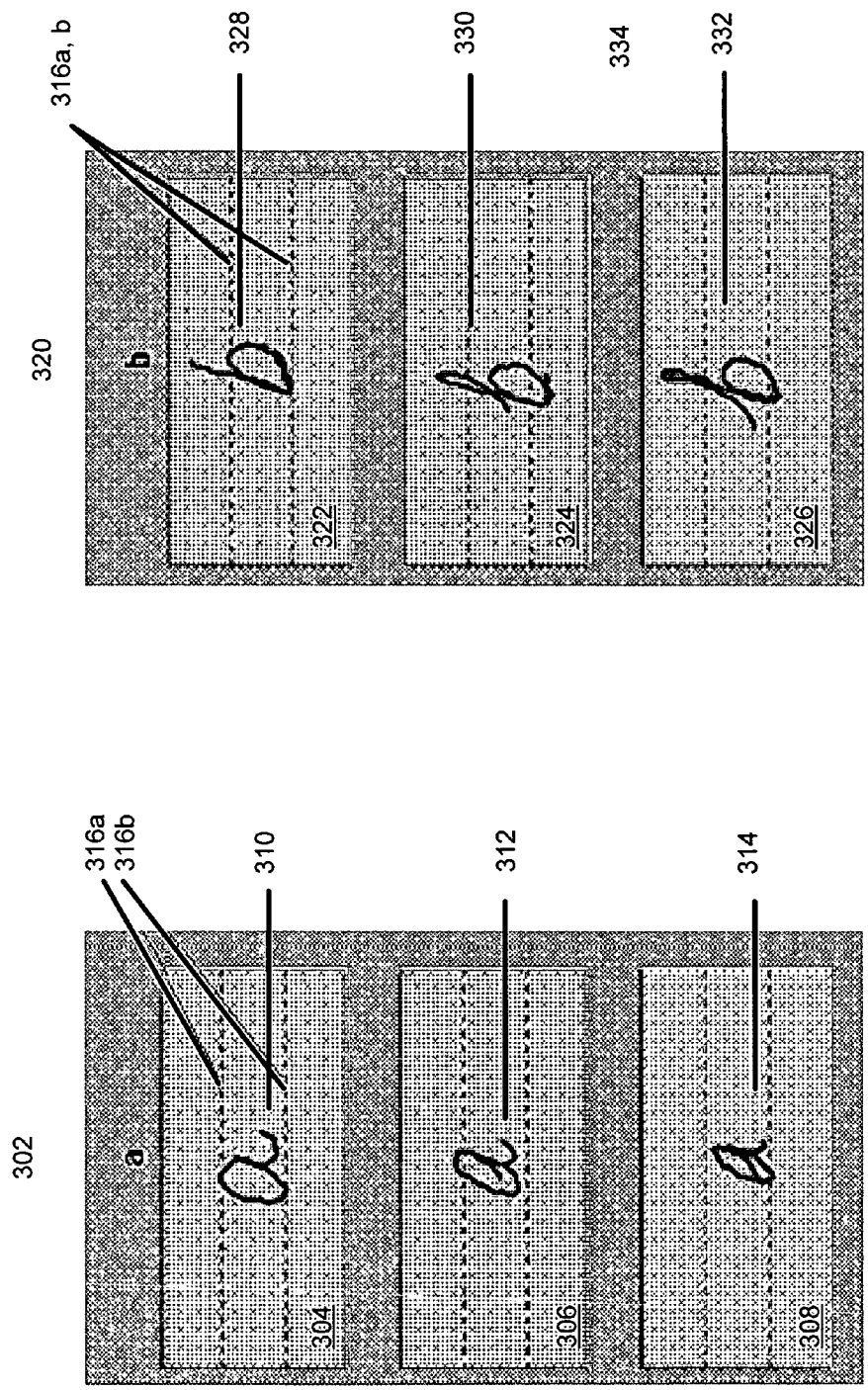
FIGS. 3a and 3b show exemplary user interfaces that may be used to receive a plurality of character samples according to one embodiment of the invention.

FIGS. 3a and 3b show one exemplary user interface that may be used to receive the plurality of character samples. As seen in the figures, advantages of at least one aspect of the invention can be appreciated. FIG. 3a shows user interface 302, which may be displayed to a user through a display device, such as monitor 107 and/or auxiliary display device 199. User interface 302 is presented to a user and allows the user to input characters corresponding to the letter "a". As seen in FIG. 3a, user interface 302 comprises user input fields 304, 306, and 308, having user inputs 310, 312, and 314 respectively.

User input 310, shown in input field 304, is provided to represent the user's handwriting of the letter "a" when the letter is a beginning character among a plurality of other characters. For example, the beginning character may be used to represent the first letter of a word, such as the word "asia", when the word is written in cursive or a format where it is otherwise connected to another character. The first letter of a word, however, is not the only instance where the "beginning" character may be used. Indeed, it is customary for some individuals to write single words as two or more collection of characters, where some of the characters in the middle of the word are not joined. Moreover, if the user generally does not write in cursive format, the "beginning character" may still be utilized for characters in the middle or end of a word or collection of characters. As shown, user input 310 shows an "a" with a trailing or "tail" section that may be connected with a following character. As one skilled in the art will realize the size, angle, and length of the tail of any of the characters may vary among users' handwriting.

User input 312, shown in input field 306, is provided by the user to represent the letter "a" as being written in the middle of a plurality of other of characters. For example, the user may write input 312 as if the letter was within a word he/she frequently writes. As shown, the letter "a" provided as user input 312 has a trailing section or tail like user input 310, but it also has a "head" or leading portion that partially transects the middle of the character, that the user did not provide in user input 310. In one embodiment, the leading portion may be used for connection with a preceding character. As one skilled in the art will realize, the leading portion may vary in size, shape, angle, and length, Some users may write the letter having a head or leading portion that fully transects the middle of the letter and extends beyond the beginning of the body of the letter.

User input 314, shown in input field 308, is provided by the user to represent the letter "a" as written as the ending character among a plurality of characters. Unlike user inputs 310 and 312, the user did not write an extended tail that connects the character to the following character, however, did write a head or leading portion for connecting with the preceding character.

As seen in each of the input fields, one or more lines, such as guide lines 316a, 316b may optionally be provided within the input fields to aid the user in writing the characters. Such guide lines may be beneficial when writing letters extending beyond the lines, such as the letter "b". In one embodiment, the guidelines aid the user in writing a normalized size of the characters and retain proper dimensions of different portions of the character. Looking to FIG. 3b, user interface 320, which also may be displayed to a user through a display device, such as monitor 107 and/or auxiliary display device 199 is presented to a user and allows the user to input characters corresponding to the letter "b". As seen in FIG. 3b, user interface 320 comprises user input fields 322, 324, and 326, having user inputs 328, 330, and 332 respectively.

As can be readily seen in the figure, the stem of the letter b extends above the top guideline 316a, while the body of the letter remains substantially within the parameter defined by the top guideline 316a and bottom guideline 316b. Note, however, that there are some variations among the user input in regards to the body of the letter, wherein the body of the letter provided as user input 330 partially extends below the bottom guideline 316b. Similar to the user inputs supplied for the letter "a", the user inputs 328, 330, and 332 show the letter "b" as being provided as the beginning character among a plurality of other characters, being provided as the character as being written in the middle of a plurality of other of characters, and being provided as written as the ending character among a plurality of characters. While three input fields are shown in both FIGS. 3a and 3b, one skilled in the art will readily appreciate that any number of fields may be used. For example, in one embodiment, user interface 320 may have a plurality of input fields to receive a user input for connecting the letter "b" with numerous other letters of the alphabet. Indeed, in one embodiment, multi-character words are presented to the user.

Figure 4:
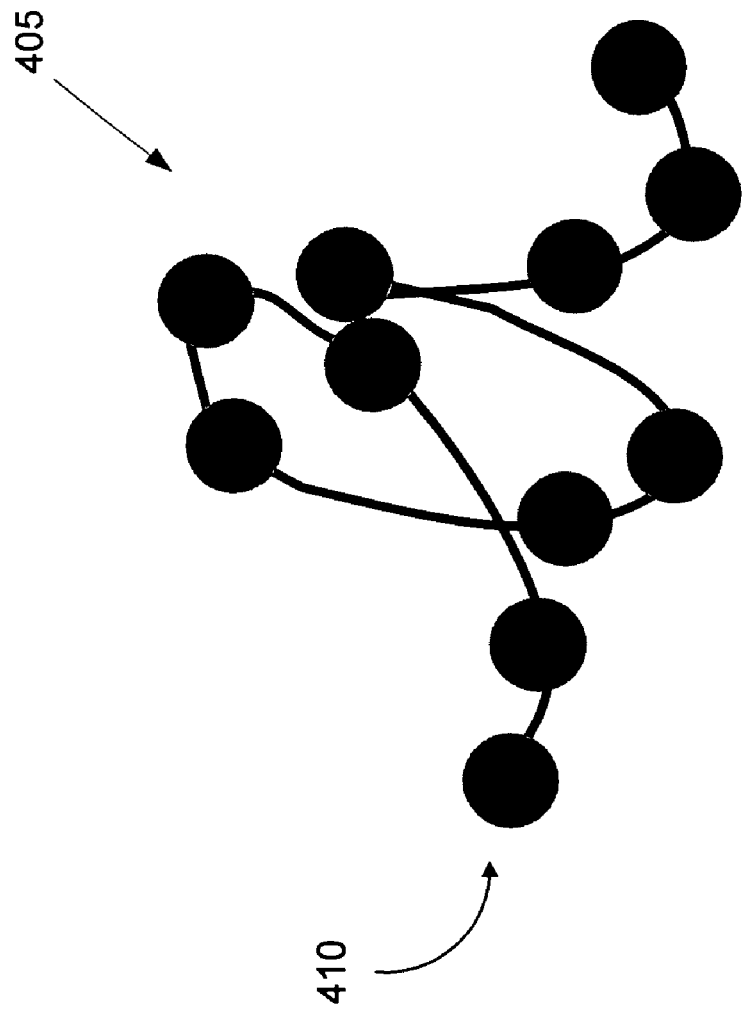
FIG. 4 shows an exemplary extraction of control points for a character according to one embodiment of the invention.

In step 210, a plurality of control points are extracted from the character. The number of control points extracted and the location of the control points may depend on a myriad of factors, including but not limited to: the desired preciseness of the final handwriting analysis, the sample provided by the user, or the specific character being entered. The extracted control points are extracted to represent the shape of the character. In one embodiment, the shape of a character may be synthesized based on spline interpolation passing the control points. For example, FIG. 4 shows an exemplary extraction of control points for a character. Looking to the figure, a character, such as character 405 representing the letter "a", is provided by a user as a single stroke through a user input device, such as through user interface 302. (As one skilled in the art will understand, other variations of "a", such as "A" or other characters require a plurality of strokes, and will be discussed in more detail later in the Specification).

A plurality of control points 410 are extracted from the character 405. The stroke may first be approximated by a polyline using Sklansky's algorithm, for example, as described in Sklansky J. and Gonzalez V., Fast Polygonal Approximation of Digitized Curves. Pattern Recognition, Vol. 12, pp. 327-331, 1980, incorporated herein by reference in its entirety. Intermediate points on the stroke may then be added back to the polyline if the distance between successive nodes of the polyline is too large or the polyline has a high curvature. Looking to the illustrative embodiment in FIG. 4, it can be seen that that there is a higher density of nodes in high curvature areas when compared to areas having low curvature.

In step 215, the vertical positioning of the character in relation to a baseline, such as one of the guidelines 316a, 316b or other character, is determined. In one embodiment, the calculation of the vertical positioning may include determining the distance from the bottom of the character to one or more baselines, yet in another embodiment, the calculation may include determining the distance from the top of the character to one or more baseline. In still yet another embodiment of the invention, the calculation may include determining the ratio of: (1) the distance from a specific control point or location on the character to (2) the overall height of the character. As one skilled in the art will readily appreciate, there are numerous methods that may determine the vertical positioning of the character.

In step 220, one or more of the samples received from the user for at least one character may be normalized. In one embodiment, all of the samples for a specific character undergo a normalization process. In another embodiment, the normalization process may be dependent of the type of character being normalized, for example, different groups of classes of letters may undergo different normalization processes. In one such embodiment, the characters may be classified by their shapes. For example, specific characters are traditionally written to fit entirely within a parameter or have a segment of the character extend beyond a parameter. For example, looking to the character "b", the main body of the character is substantially within the parameter defined by the top guideline 316a and the bottom guideline 316b. Moreover, a stem passes through the top guideline 316a. These and other characteristics may be used to define how the character is normalized.

In one embodiment of the invention, letters such as "b" that are ascenders (ascend above the top guideline 316a) may be grouped together. Exemplary ascenders may include: b, d, h, i, k, l, and t. One skilled in the art will understand there are additional alphanumeric and other characters that may be included within this classification. In one embodiment of the invention, the average height of the characters classified as an ascender is utilized to normalize the character samples. However, as explained in more detail below, variation of the height of the individual characters may be undertaken at another step to further increase personalization.

Another possible classification may include those characters which are written with the entire character substantially within the parameter defined by the top guideline 316a and bottom guideline 316b (referred to as "middle zone characters"). Such middle zone characters may include the letters: a, c, e, m, n, o, r, s, u, v, w, and x. However, any character which is substantially within the guidelines may be classified as a middle zone character. In one embodiment of the invention, the average height of the middle zone characters may be utilized in normalizing the character samples. In one embodiment, the average heights of middle zone and ascender characters are applied to the original heights for normalization. One such equation may be:

scale=AverageHeight$_i$/Height$_j$, $W_j$=scale*$W_j$,
$H_j$=scale*$H_j$, where $i$=1,2; $j$=a,c,e,m,n,o,r,s,u,v,w, x,b,d,h,i,k,l,t Regarding classification, those characters which have a stem or segment that substantially crosses a bottom guideline, such as 316b, (hereafter referred to as "descenders") may be grouped together. Such descenders may include, but are not limited to: g and y. Characters that have at least one stem or segment that crosses both guidelines (hereinafter referred to as "multi-zone characters") may also be grouped together. As one skilled in the art will readily understand, there are certain characters that may be classified according to different classifications when written by different users. For example, the letter z may be written as a middle zone character or a descender. According one embodiment, computer-executable instructions may determine how the character should be classified depending on a user input. In yet another embodiment, such letters may be grouped in an entirely different category.

While some groups of characters may be optimized by utilizing the average height of the characters, other groupings, such as multi-zone characters, whose shapes are not very certain, may have the character optimized with an optimal algorithm. According to one possible algorithm, the scaling factors may be about 1, so that the height and width of the characters are substantially equal. In one such embodiment, the characters may be optimally scaled with $s_i$ so that their widths are approximately $W_{normalize}$ and their heights are close to each other (We need to normalize the size of letters, but normalizing according to either width or height is not optimal. we introduce $W_{normalize}$ because the letter size may not be close to each other). The method is to minimize:

$$g(s) = \frac{1}{2}\sum_{i=1}^{N}(s_i w_i - W)^2 + \frac{1}{2}\sum_{i=1}^{N}\left(s_i h_i - \frac{1}{N}\sum_{j=1}^{N} s_j h_j\right)^2,$$

where $s_i w_i$ and $s_i h_i$ are the width and height after scaling, and N is the number of sample letters. The optimal s makes:

$$\frac{\partial g}{\partial s_k} = (w_k^2 + h_k^2)s_k - \frac{1}{N}h_k\sum_{j=1}^{N} h_j s_j - W w_k = 0.$$

Therefore it satisfies the following equation:

$$(\Lambda - hh^T)s = W(w_1 \ldots w_N)^T,$$

where $\Lambda = diag(h_1^2 + w_1^2, \ldots, h_N^2 + w_N^2)$ and

-continued $h = (h_1 \ldots h_N)^T / \sqrt{N}$. The inverse of $(\Lambda - hh^T)$ is:

$$A = (\Lambda - hh^T)^{-1} = \Lambda^{-1} + \frac{\Lambda^{-1}hh^T\Lambda^{-1}}{1 - h^T\Lambda^{-1}h}.$$

The optimal $W_{normalize}$ should make the scaling factors as close to 1 as possible, i.e., it should minimize:

$$\phi(W) = \frac{1}{2}\sum_{i=1}^{N}(s_i - 1)^2$$

$$= \frac{1}{2}(s - e)^T(s - e)$$

$$= \frac{1}{2}(WAw - e)^T(WAw - e),$$

where
$e = (1 \ldots 1)^T$ and $w = (w_1 \ldots w_N)^T$. Then the optimal $W_{normalize}$ is:

$$W_{opt} = \frac{e^T Aw}{w^T A^T Aw}.$$

Denote the normalized height by $H_{normalize}$. It equals to the average height of character after optimal scaling. The optimal $W_{normalize}$ and $H_{normalize}$ are computed for every character.

If more than one character is provided, wherein the plurality of characters are provided in a string, form a word, or otherwise determined to be connected (whether by computer-executable instructions or the user) optional step 225 may be initiated. At step 225, one or more characters may undergo a kerning process to determine the average horizontal distance between the central axes of two or more successive characters. In one embodiment, the average distance d between the central axes of successive letters with slant l is assumed to be L/M, where L is the width of the bounding parallelogram of the word and M is the number of letters in the word, wherein the distribution of $d_i$ is formed because each plurality of character can provide an estimate of the average distance d.

Optional step 230 may also be used where a collection of characters are written in a cursive format or otherwise connected to determine the connection inclination. In one embodiment, step 230 determines the probability of the user to write in cursive style. The process may be combined with an a priori connection-probability table, which describes the easiness of connecting a pair of letters, to decide the probability of connecting two given letters (the "connection inclination" for those two letters) for a particular user.

Suppose the number of letters in a word is n. If the user writes it without connection, there should be k strokes (k may not be equal to n because there may be multi-stroke letters). If l strokes are collected from the word written by the user, then the connection inclination for the word is computed as follows:

$P_{user}^i = (k-l)/(n-1)$ if $P_{user}^i < 0$, $P_{user}^i = 0$ if $P_{user}^i > 0$, $P_{user}^i = 1$ For the i-th word, we can get a $P_{user}^i$. Assuming that there are m words, then the connection inclination of the user is computed as follows:

$$P_{user} = \frac{1}{m}\sum_{i=1}^{m} p_{user}^{i}.$$

The application of connection inclination values is discussed in more detail later in the Specification.

Figure 5:
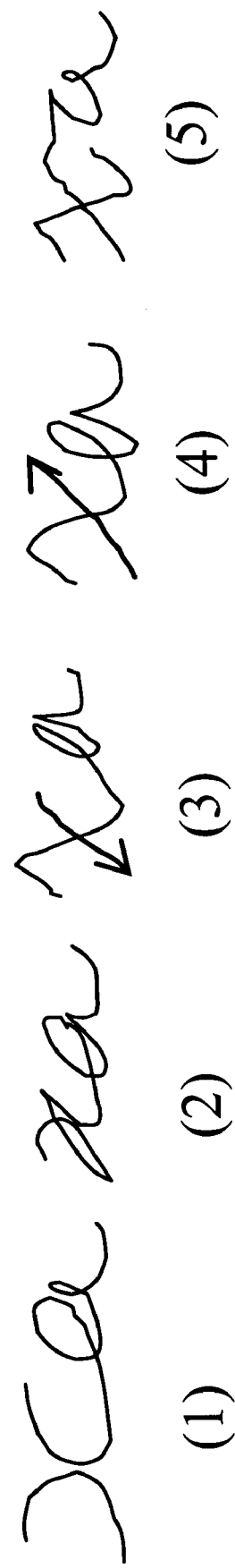
FIG. 5 shows an exemplary connection possibilities between a multi-stroke character connected to a single stroke character.

In select embodiments of the invention, step 235 may be utilized to determining the sample comprises a character that is a multi-stroke letter that requires a plurality of user strokes when written and how it connects to other characters. This deserves special attention. Generally, for characters written with a single stroke, the user connects the previous character at the beginning of the stroke and connects the following character at the ending of the stroke. However, for multi-stroke characters, such as the letters "f, i, j, t, x, z", training may become more complex because different users may have different ways to write this character and connect this it with the proximate characters. For example, as shown in FIG. 5, there are five cases that "x" connects with "a". Therefore, step 235 may be used to determine the way(s) the user connects the specific character with other characters.

In one embodiment, a graphical user interface that displays the multi-stroke character to the user. The UI may require the user to write a plurality of combinations of "f, i, j, t, x, z" with "a" (such as "af", "fa", "ia", "ai", etc.) in order to determine which stroke of the letters will be connected with that of other character. As one skilled in the art will realize, other characters besides "a" may be chosen, however, the Applicants have found that the character "a" is a proper candidate for testing because it is usually completed in one stroke, thereby reducing the complexity of analysis, and the stroke for "a" has enough length so that the length test in the connection style detection can be effective.

In step 240, the amount of pressure the user applies while inputting the handwriting sample may be determined. In one embodiment, the user may write the characters on a pressure sensitive keyboard or pad where the pressure of each stroke or segments within each stroke is measured. Such measurements may be used when synthesizing the user's handwriting, such as according to one or more embodiments discussed below.

Figure 6:
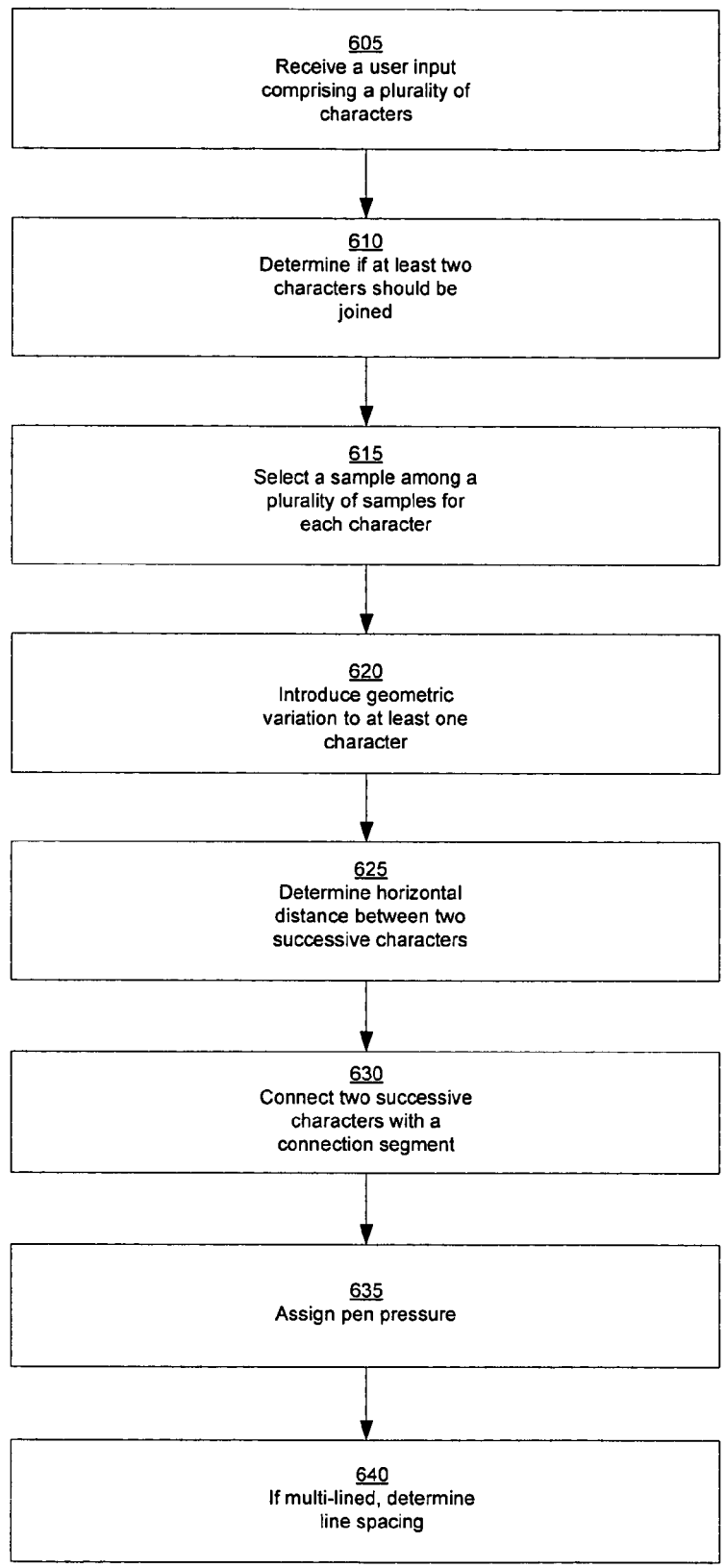
FIG. 6 is a flow diagram of one illustrative method of displaying a representation of a computer user's handwriting.

Further aspects of the invention relate to a computer-implemented method of synthesizing and displaying a representation of a computer user's handwriting. FIG. 6 is a flow diagram of one illustrative method of displaying a representation of a computer user's handwriting on a display device, such as monitor 107 and/or auxiliary display device 199. In step 605, a user input comprising a plurality of characters is received through a user input device, such as a keyboard.

In step 610, it is determining whether at least two characters received in the user input of step 605 should be joined. In one embodiment, computer-executable instructions tangibly embedded on a computer-readable medium dictate that connections may be determined to exist between two characters written as lowercase alphabetic characters and/or numeric characters. In one such embodiment, connection probability tables, for example, one for lowercase alphabetic characters and another for numeric characters may be utilized. These connection probability tables can be estimated from some data set or simply be chosen empirically. An engine may then sample a connection state for proximate characters in a collection of characters, for example, a word.

In one embodiment, a connection table may be generated by combining the user's connection inclination (for example, as calculated in step 230) with a probability table of connections for particular characters. For example, in one embodiment, the probability of two characters, the i-th and the j-th characters, being connected may be estimated with the equation:

if $(P_{user}=0 \| P_{user}=1)$ $P_{i,j}=P_{user}$;

else $P_{i,j}=\min(\max(P_{i,j}, \alpha P_{user}),1)$ where $\alpha$ is a weight value for $P_{user}$, because users usually write less cursively in sample writing than in actual writing. In one embodiment, the computer-readable instruction sets $\alpha$ to be 1.25.

As one skilled in the art will realize, the above equation is but just one exemplary method of determining whether two or more proximate characters should be joined, and that other equations may be used in conjunction with or independently of the above equation without departing from the scope of the invention. Indeed, in yet another embodiment, the inclination may be toggled "on" and "off" by the user and only the probability tables themselves are considered.

Figure 7:
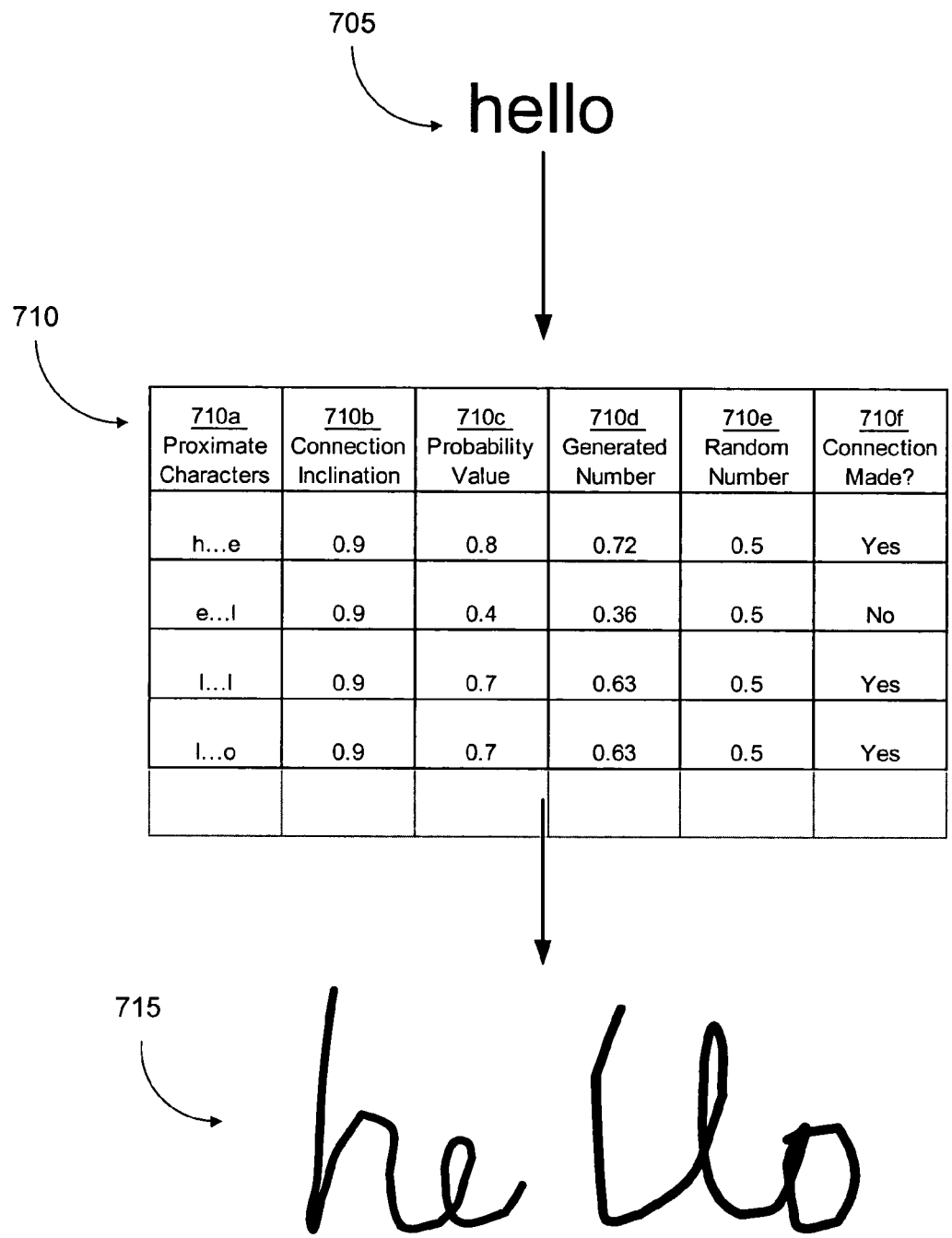
FIG. 7 shows one illustrative collection of characters being synthesized with a probability table according to one aspect of the invention.

FIG. 7 shows one illustrative collection of characters being synthesized with a probability table according to one aspect of the invention. As seen in the figure, a collection of characters 705 is provided by the user through a user input device. In the illustrative example, the collection of characters is in the form of a word, the word being "hello". A probability table, such as probability table 710 may be accessed to determine whether to connect the individual characters h-e-l-l-o. For the illustrative example, a connection inclination of the user has been estimated at 0.9. This value has been entered into the column 710*b*. As previously mentioned, the use of a connection inclination is optional and need not be incorporated for use with the probability table.

As seen in the table 710, column 710*a* provides a row for each of the groupings or proximate characters. In the illustrative example, the first row has the characters "h" and "e" representing the first two characters of the word "hello". As indicated with column 710*c*, each pair of proximate characters has a probability of being connected. This value may be determined by initially presenting a plurality of multi-character words to a user to determine the probability that certain character pairings would be connected when written by the user. In one embodiment, the Applicants have discovered that as few as 20 multi-character words can be received from the user to determine a probability value, such as those presented in column 710*c*. In yet another embodiment, the user's handwriting may be continuously or routinely monitored to determine and update the connection probability of the characters.

Looking to the proximate characters "h" and "e" in the first row, there is an 80% probability (see column 710*c*; listing a "0.8" probability) that the characters are connected when the user writes them in that combination. The probably values of column 710*c* may be used to dictate that 80% of the instances where the characters "h" and "e" are presented, they will be connected. In yet another embodiment, the probability values of column 710*c* may be used in conjunction with a random number to determine if the characters are connected. In one embodiment, a single random number is generated for the entire table (as illustrated in the exemplary table), yet in other embodiments, a different random number may be generated for each character combination (row).

In the exemplary table, the probability values (column 710*c*) are multiplied with the connection inclination for that user (column 710*b*) to provide a generated number (column 710*d*). In one embodiment, if the generated number is higher than the random number, a connection is made for that particular character combination. For example, looking to the first character combination of "h" and "e" (the first row), there is a connection inclination of 0.9 and a probability value of 0.8. Multiplying the connection inclination by the probability value provides a generated number of 0.72. Since the generated number is higher than the random number (0.5), the "h" is connected to the "e". Conversely, the character combination shown in the second row ("e" and "l") has a probability value of 0.4, wherein upon being multiplied by the connection inclination (0.9) provides a generated number of 0.36. Since 0.36 is lower than the random number (0.5), the "e" is not connected to the "l". As seen in the remaining rows of the probability table 710, the generated numbers of each of the remaining proximate character pairings for the word are higher than the random number, thereby resulting in those proximate characters being connected in a cursive fashion.

In step 715, a sample for each character of the word or collection of characters is selected. The selected sample is among a plurality of samples stored on a computer-readable medium to represent the character, wherein the plurality of samples comprises at least one sample of the character being provided as the beginning character among a plurality of other characters, at least one sample of the character being provided as being in the middle of a plurality of other of characters, and at least one sample of the character being provided as the ending character among a plurality of characters, wherein the selected sample comprises at least one segment selected from the group consisting of a heading segment, a tailing segment, and a central axis. The samples may be stored on a remote computer-readable or local medium. In one embodiment, the samples comprise those received in step 205.

Using the illustrative example of FIG. 7, the word "hello" was determined to have all the characters connected with the exception of the "e" and the "l". Output 715 is an illustrative output of according to one embodiment of the invention. Looking to output 715, a sample for the character "h" will be selected. Since it is the first letter of the word, the sample provided to represent "h" as the beginning character will be selected. However, selecting the sample to represent the character "e" is not as simple. While "e" is not the ending character of the word "hello", step 710 determined that "e" and "l" are not connected. Therefore, in at least one embodiment of the invention, computer-executable instructions determine the proper sample for "e" is the sample of "e" being provided as the ending character among a plurality of characters.

Similarly, since the first "l" in "hello" is not connected to the preceding character, computer-executable instructions may determine that the proper sample is the sample of the character being provided as the beginning character among a plurality of other characters. Looking to output 715, it is readily apparent that the second "l" appears much different. This is because the second "l" is preceded by a character ("e") and is followed by another character ("o"); therefore the sample used to represent the second "l" is the sample of the character being provided as being in the middle of a plurality of other of characters. This provides increased personalization of the output 715. Lastly, the character "o" is the final character of the word, and accordingly a sample representing an ending character is utilized.

While the above step introduces variety within the user's handwriting and creates a more realistic recreation than prior art methods, optional step 620 may be utilized to create geometric variation into one or more characters chosen in step 615. It is widely known that when user's write out characters at different times, there are slight variations in the size, curvature, and other characteristics of the characters. Step 620 may perform geometric variation by local random rotation and scaling of one or more stroke pieces, for example, at high curvature points, such as corners of the character. For example, the character "w" has at least 3 points that are corners or have high curvature rates, and at least 2 ending points for which geometric variation may be applied. In one embodiment of the invention, the following equations may be used to provide rotation and/or scaling to the corner points of the character:

$$\text{Rotate} \begin{cases} x_1 = (x_{old} - x_{oldOrigin}) * \cos\theta - (y_{old} - y_{oldOrigin}) * \sin\theta \\ y_1 = (x_{old} - x_{oldOrigin}) * \sin\theta + (y_{old} - y_{oldOrigin}) * \cos\theta \end{cases}$$

$$\text{Scale} \begin{cases} x_{new} = x_1 * \text{scale} + x_{newOrigin} \\ y_{new} = y_1 * \text{scale} + y_{newOrigin} \end{cases}$$

$$\text{in which } \begin{cases} x_{oldOrigin} = x_{oldLastEnd} \\ y_{oldOrigin} = y_{oldLastEnd} \end{cases}$$

$$\begin{cases} x_{newOrigin} = x_{newLastEnd} \\ y_{newOrigin} = y_{newLastEnd} \end{cases}$$

The inventors have discovered that selecting $\theta \in [-3°, 3°]$, scale $\in [0.75, 1.05]$ wherein each are uniformly sampled provides acceptable recreation and variation of the character, however, one skilled in the art will realize the scaling and/or rotation may be performed according to different parameters.

As is widely recognized, individual users vary in the amount of horizontal spacing in-between different characters. Therefore, by determining a horizontal distance between two or more characters of a word or collection of characters, the output will appear more personalized. In one embodiment of the invention, step 625 is implemented to determine a horizontal distance between the central axes of at least two of the samples chosen, wherein the horizontal distance between two samples may be a different distance than the horizontal distance between another two samples chosen.

Figure 8:
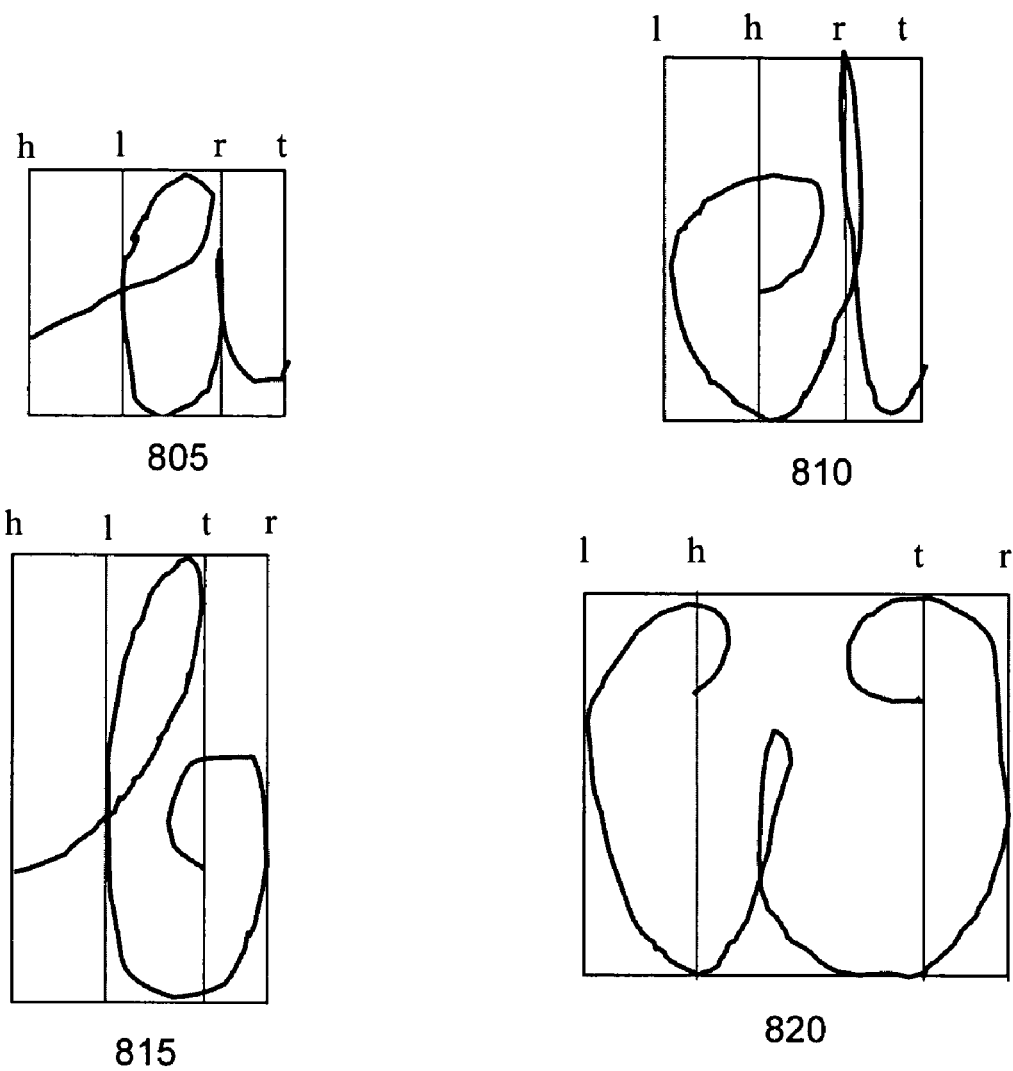
FIG. 8 provides four illustrative characters according to one embodiment of the invention.

In one embodiment, specific lines within the character are located, such as for example, one or more of the following: head line ("h"), left line ("l"), right line ("r"), and a tail line ("t"). As one skilled in the art will appreciate, the term "line" simply refers to a segment of the character, as does not require the "line" to be straight. FIG. 8 provides four illustrative characters (805, 810, 815, and 820) to more clearly show these lines according to one embodiment of the invention. As seen with the illustrative figures, the head and tail lines are just the lines passing the starting and the ending points of the stroke, respectively. In one embodiment, the detection of head and tail lines may be based on corners and maximum-minimum x and y values. The left and right lines are the left and right bounding lines of the letter after eliminating the heading and tailing parts of the letter, which are considered to be parts of connection and may be cut appropriately for better connection (see step 630, below).

Figure 9:
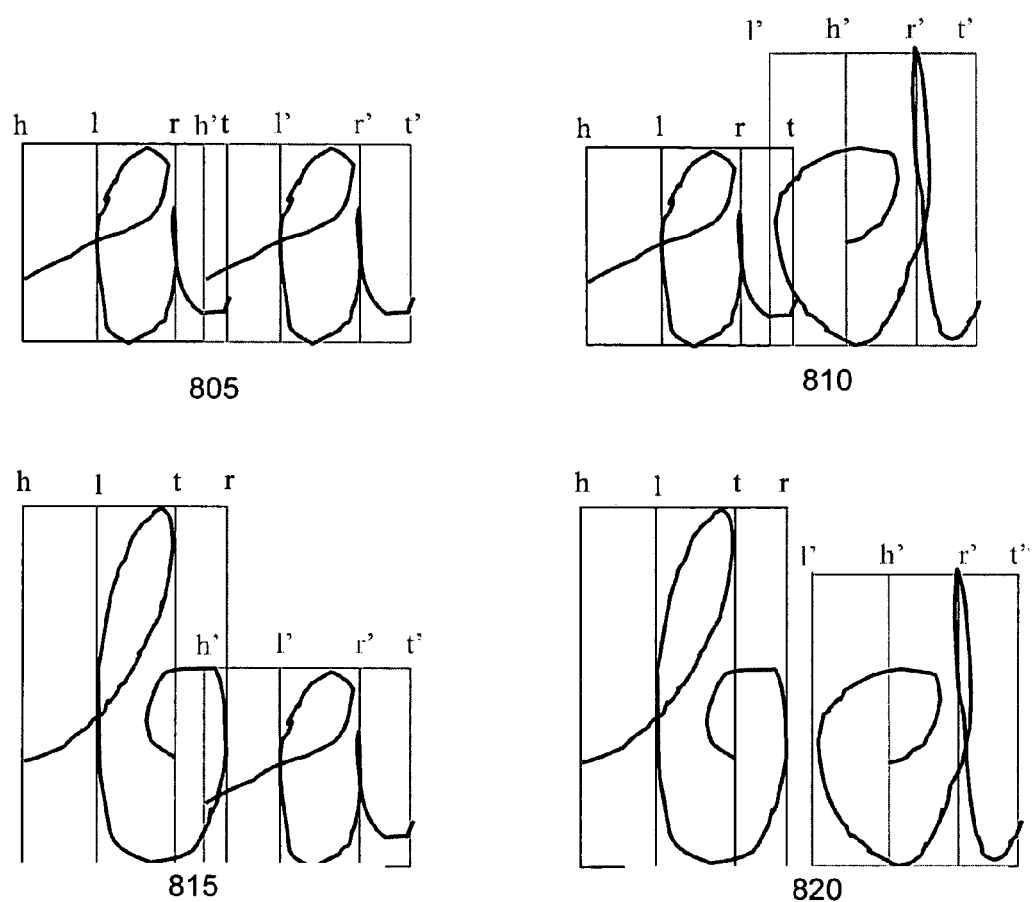
FIG. 9 shows illustrative character pairs being joined at a horizontal distance from one another

According to one embodiment, a kerning d from a kerning distribution is sampled, then the horizontal distance between the central axes of current letter and the successive letter may be denoted by md. FIG. 9 shows illustrative character pairs being joined at a horizontal distance from one another. In one embodiment, the characters are placed one by one in a substantially horizontal arrangement according to the kerning and a segment, such as the tail and/or head segments may be adjusted. For example if $L_{i,t} < L_{i,r}$, such as with like character pairings 915 (pairing "b" with "a") and 920 (pairing "b" with "d"), the tail is not cut; however, if $L_{i,t} > L_{i+1,l}$, such as with pairing 910 (pairing "a" with "d") or $L_{i,r} > L_{i+1,h}$, such as with pairing 905 (pairing "a" with "a"), then the tail of the $i^{th}$ letter may be cut, for example, at $\max \lfloor L_{i,r}, \min(L_{i+1,h}, L_{i+1,l}) \rfloor$. Wherein ConCPIndex[1]-=Count(Cut Piece), where ConCPIndex[0] and ConCPIndex[1] are indexes of connection points of the character that may be computed after sampling. In yet further embodiments, the head of a character may be adjusted. In one embodiment, if $L_{i+1,h} > L_{i+1,l}$, such as seen in character pairings 910 and 920, then the head will not be removed, however, if $L_{i+1,h} < L_{i,r}$, such as with pairing 915 or $L_{i+1,h} < L_{i,r}$, such as with pairing 905, then the head may be cut, for example, at $\min \lfloor L_{i+1,l}, \max(L_{i,r}, L_{i,r}) \rfloor$, wherein ConCPIndex[1]-=Count(Cut Piece) and End If where ConCPIndex[1] indicates the index of the ending connection point of the current character.

As one skilled in the art will realize, a connection segment may be utilized to attach two or more characters (step 630), such as by connecting the tail portion of one character to the head portion of another character. In one embodiment, a 3-order polynomial may be utilized to fit the connection part, which consists of the tailing and heading parts and the line segment linking the ending point of the tailing part and the beginning (or second) point of the heading part. By using this approach, three energy functions are used to measure the closeness of old and new connection parts, the bending energy, and the smoothness of the connection, respectively. According to one embodiment, the polynomial which minimizes the whole energy may be used is the final connection piece.

In one embodiment of the invention, the connection curve can be parameterized by:

$$P(t) = \sum_{k=0}^{P} P_k t^k, \ t \in [0, 1].$$

Then $$E_1 = \int_0^1 \xi_1(s) \|O(s) - P(s)\|^2 ds$$

$$= \int_0^1 \xi_1(s) \left\| O(s) - \sum_{k=0}^{P} P_k s^k \right\|^2 ds$$

$$= \int_0^1 \xi_1(s) \|O(s)\|^2 ds - 2 \sum_{k=0}^{P} P_k \cdot \int_0^1 s^k \xi_1(s) O(s) ds +$$

$$\sum_{k=0}^{P} \sum_{l=0}^{P} P_k \cdot P_l \int_0^1 \xi_1(s) s^{k+l} ds$$

$$\equiv E_{11} - 2 \sum_{k=0}^{P} P_k \cdot E_{12}(k) + \sum_{k=0}^{P} \sum_{l=0}^{P} E_{13}(k, l) P_k \cdot P_l$$

which measures the closeness of old and new connections, $$E_2 = \int_0^1 \xi_2(s) \|O'(s) - P'(s)\|^2 ds$$

$$= \int_0^1 \xi_2(s) \left\| O'(s) - \sum_{k=1}^{P} k P_k s^{k-1} \right\|^2 ds$$

$$= \int_0^1 \xi_2(s) \|O'(s)\|^2 ds - 2 \sum_{k=1}^{P} P_k \cdot \int_0^1 k s^{k-1} \xi_2(s) O'(s) ds +$$

-continued $$\sum_{k=1}^{P} \sum_{l=1}^{P} P_k \cdot P_l \int_0^1 k l \xi_2(s) s^{k+l-2} ds$$

$$\equiv E_{21} - 2 \sum_{k=1}^{P} P_k \cdot E_{22}(k) + \sum_{k=1}^{P} \sum_{l=1}^{P} E_{23}(k, l) P_k \cdot P_l$$

which measures the bending energy, $$E_3 = \int_0^1 \xi_3(s) \|P''(s)\|^2 ds$$

$$= \int_0^1 \xi_3(s) \left\| \sum_{k=2}^{P} k(k-1) P_k s^{k-2} \right\|^2 ds$$

$$= \sum_{k=2}^{P} \sum_{l=2}^{P} P_k \cdot P_l \int_0^1 k(k-1) l(l-1) \xi_3(s) s^{k+l-4} ds$$

$$\equiv \sum_{k=2}^{P} \sum_{l=2}^{P} E_{33}(k, l) P_k \cdot P_l$$

which measures the smoothness of the connection.

In one embodiment, an attempt is made to minimize $$E = \sum_{i=1}^{3} \lambda_i E_i \qquad (0)$$

$$= \sum_{i=1}^{3} \lambda_i \left[ E_{i1} - 2 \sum_{k=0}^{P} P_k \cdot E_{i2}(k) + \sum_{k=0}^{P} \sum_{l=0}^{P} E_{i3}(k, l) P_k \cdot P_l \right]$$

$$= \sum_{i=1}^{3} \lambda_i E_{i1} - 2 \sum_{k=0}^{P} P_k \cdot \sum_{i=1}^{3} \lambda_i E_{i2}(k) +$$

$$\sum_{k=0}^{P} \sum_{l=0}^{P} \left( \sum_{i=1}^{3} \lambda_i E_{i3}(k, l) \right) (P_k \cdot P_l)$$

where $E_{31}=0$, $E_{i2}(k)=0$ if $k=0$ or $i=3$, and $E_{i3}(k,l)=0$ if $k<2$ or $l<2$, subject to:

$$P_0 = O_S, \ \sum_{k=0}^{P} P_k = O_E, \qquad (1)$$

$$P_1 = O'_S, \ \sum_{k=1}^{P} k P_k = O'_E,$$

We may remove $P_0, \ldots, P_3$ in (0) by using the relationship of (1):

$$P_0 = O_S, \ P_1 = O'_S,$$

$$P_2 = 3O_E - 3O_S - 2O'_S - O'_E + \sum_{k=4}^{P} (k-3) P_k,$$

$$P_3 = -2O_E + 2O_S + O'_S + O'_E - \sum_{k=4}^{P} (k-2) P_k,$$

where $O_S, O_S', O_E, O_E'$ are the starting, ending points and their tangent vector of the old connection curve, respectively, and make E a function of $P_4, \ldots, P_P$. Then compute $$0 = \frac{\partial E}{\partial P_j}$$

$$= -2(j-3)\sum_{i=1}^{3}\lambda_i E_{i2}(2) + 2(j-2)\sum_{i=1}^{3}\lambda_i E_{i2}(3) -$$

$$2\sum_{i=1}^{3}\lambda_i E_{i2}(j) + 2\sum_{l=0}^{P}\left(\begin{array}{c}(j-3)\sum_{i=1}^{3}\lambda_i E_{i3}(l,2) - (j-2)\\ \sum_{i=1}^{3}\lambda_i E_{i3}(l,3) + \sum_{i=1}^{3}\lambda_i E_{i3}(l,j)\end{array}\right)P_l,$$

$$(j = 4, \ldots, P)$$

$$0 = -(j-3)\sum_{i=1}^{3}\lambda_i E_{i2}(2) + (j-2)\sum_{i=1}^{3}\lambda_i E_{i2}(3) - \sum_{i=1}^{3}\lambda_i E_{i2}(j) +$$

$$\left(\begin{array}{c}(j-3)\sum_{i=1}^{3}\lambda_i E_{i3}(0,2) - (j-2)\\ \sum_{i=1}^{3}\lambda_i E_{i3}(0,3) + \sum_{i=1}^{3}\lambda_i E_{i3}(0,j)\end{array}\right)O_S +$$

$$\left(\begin{array}{c}(j-3)\sum_{i=1}^{3}\lambda_i E_{i3}(1,2) - (j-2)\\ \sum_{i=1}^{3}\lambda_i E_{i3}(1,3) + \sum_{i=1}^{3}\lambda_i E_{i3}(1,j)\end{array}\right)O_S' +$$

$$\left(\begin{array}{c}(j-3)\sum_{i=1}^{3}\lambda_i E_{i3}(2,2) - (j-2)\\ \sum_{i=1}^{3}\lambda_i E_{i3}(2,3) + \sum_{i=1}^{3}\lambda_i E_{i3}(2,j)\end{array}\right) \times$$

$$\left(3O_E - 3O_S - 2O_S' - O_E' + \sum_{k=4}^{P}(k-3)P_k\right) +$$

$$\left(\begin{array}{c}(j-3)\sum_{i=1}^{3}\lambda_i E_{i3}(3,2) - (j-2)\\ \sum_{i=1}^{3}\lambda_i E_{i3}(3,3) + \sum_{i=1}^{3}\lambda_i E_{i3}(3,j)\end{array}\right) \times$$

$$\left(-2O_E + 2O_S + O_S' + O_E' - \sum_{k=4}^{P}(k-2)P_k\right) +$$

$$\sum_{l=4}^{P}\left(\begin{array}{c}(j-3)\sum_{i=1}^{3}\lambda_i E_{i3}(l,2) - (j-2)\\ \sum_{i=1}^{3}\lambda_i E_{i3}(l,3) + \sum_{i=1}^{3}\lambda_i E_{i3}(l,j)\end{array}\right)P_l$$

$$= -\left(\begin{array}{c}(j-3)\sum_{i=1}^{3}\lambda_i E_{i2}(2) + (j-2)\\ \sum_{i=1}^{3}\lambda_i E_{i2}(3) - \sum_{i=1}^{3}\lambda_i E_{i2}(j)\end{array}\right) +$$

$$\left[\begin{array}{c}(j-3)\sum_{i=1}^{3}\lambda_i E_{i3}(0,2) - (j-2)\\ \sum_{i=1}^{3}\lambda_i E_{i3}(0,3) + \sum_{i=1}^{3}\lambda_i E_{i3}(0,j) -\\ 3\left(\begin{array}{c}(j-3)\sum_{i=1}^{3}\lambda_i E_{i3}(2,2) - (j-2)\\ \sum_{i=1}^{3}\lambda_i E_{i3}(2,3) + \sum_{i=1}^{3}\lambda_i E_{i3}(2,j)\end{array}\right) +\\ 2\left(\begin{array}{c}(j-3)\sum_{i=1}^{3}\lambda_i E_{i3}(3,2) - (j-2)\\ \sum_{i=1}^{3}\lambda_i E_{i3}(3,3) + \sum_{i=1}^{3}\lambda_i E_{i3}(3,j)\end{array}\right)\end{array}\right]O_S +$$

$$\left[\begin{array}{c}(j-3)\sum_{i=1}^{3}\lambda_i E_{i3}(1,2) - (j-2)\\ \sum_{i=1}^{3}\lambda_i E_{i3}(1,3) + \sum_{i=1}^{3}\lambda_i E_{i3}(1,j) -\\ 2\left(\begin{array}{c}(j-3)\sum_{i=1}^{3}\lambda_i E_{i3}(2,2) - (j-2)\\ \sum_{i=1}^{3}\lambda_i E_{i3}(2,3) + \sum_{i=1}^{3}\lambda_i E_{i3}(2,j)\end{array}\right) +\\ \left(\begin{array}{c}(j-3)\sum_{i=1}^{3}\lambda_i E_{i3}(3,2) - (j-2)\\ \sum_{i=1}^{3}\lambda_i E_{i3}(3,3) + \sum_{i=1}^{3}\lambda_i E_{i3}(3,j)\end{array}\right)\end{array}\right]O_S' +$$

$$\left[\begin{array}{c}3\left(\begin{array}{c}(j-3)\sum_{i=1}^{3}\lambda_i E_{i3}(2,2) - (j-2)\\ \sum_{i=1}^{3}\lambda_i E_{i3}(2,3) + \sum_{i=1}^{3}\lambda_i E_{i3}(2,j)\end{array}\right) -\\ 2\left(\begin{array}{c}(j-3)\sum_{i=1}^{3}\lambda_i E_{i3}(3,2) - (j-2)\\ \sum_{i=1}^{3}\lambda_i E_{i3}(3,3) + \sum_{i=1}^{3}\lambda_i E_{i3}(3,j)\end{array}\right)\end{array}\right]O_E +$$

$$\left[\begin{array}{c}-\left(\begin{array}{c}(j-3)\sum_{i=1}^{3}\lambda_i E_{i3}(2,2) - (j-2)\\ \sum_{i=1}^{3}\lambda_i E_{i3}(2,3) + \sum_{i=1}^{3}\lambda_i E_{i3}(2,j)\end{array}\right) +\\ \left(\begin{array}{c}(j-3)\sum_{i=1}^{3}\lambda_i E_{i3}(3,2) - (j-2)\\ \sum_{i=1}^{3}\lambda_i E_{i3}(3,3) + \sum_{i=1}^{3}\lambda_i E_{i3}(3,j)\end{array}\right)\end{array}\right]O_E' +$$

$$\sum_{l=4}^{P}\begin{bmatrix}(l-3)\begin{pmatrix}(j-3)\sum_{i=1}^{3}\lambda_i E_{i3}(2,2)-(j-2)\\ \sum_{i=1}^{3}\lambda_i E_{i3}(2,3)+\sum_{i=1}^{3}\lambda_i E_{i3}(2,j)\end{pmatrix}-\\ (l-2)\begin{pmatrix}(j-3)\sum_{i=1}^{3}\lambda_i E_{i3}(3,2)-(j-2)\\ \sum_{i=1}^{3}\lambda_i E_{i3}(3,3)+\sum_{i=1}^{3}\lambda_i E_{i3}(3,j)\end{pmatrix}\\ \begin{pmatrix}(j-3)\sum_{i=1}^{3}\lambda_i E_{i3}(l,2)-(j-2)\\ \sum_{i=1}^{3}\lambda_i E_{i3}(l,3)+\sum_{i=1}^{3}\lambda_i E_{i3}(l,j)\end{pmatrix}\end{bmatrix}+P_l$$

Let the cardinal spline be:

$$P_n(t)=\sum_{m=0}^{3}p_{n,m}t^m$$

and stiffness parameter curve $$\xi_i(s)=\sum_{m=0}^{M_i}\xi_{i,m}s^m.$$

For convenience, we assume that the line segment linking the ending point of the former letter and the starting point of the latter letter has been added sufficient number of control points, such that the spline-interpolated curve is sufficiently close to the linking line segment.

The 3-order cardinal spline interpolation formula are:

$$\begin{cases}x(t)=x_0 P_0(t)+x_1 P_1(t)+x_2 P_2(t)+x_3 P_3(t)\\ y(t)=y_0 P_0(t)+y_1 P_1(t)+y_2 P_2(t)+y_3 P_3(t)\end{cases}$$

$$\begin{cases}P_0(t)=at^3-2at^2+at\\ P_1(t)=(a+2)t^3-(a+3)t^2+1\\ P_2(t)=-(a+2)t^3+(2a+3)t^2-at\\ P_3(t)=-at^3+at^2\end{cases}$$

Then $$\Delta s_i = s_{i+1}-s_i = \int_0^1 \left\|\sum_{j=-1}^{2}P_j'(t)O_{j+i}\right\|^2 dt$$

$$=\sum_{j=-1}^{2}\sum_{l=-1}^{2}(O_{j+i}\cdot O_{l+i})\int_0^1 P_j'(t)P_l'(t)dt$$

$$=\sum_{j=-1}^{2}\sum_{l=-1}^{2}(O_{j+i}\cdot O_{l+i})\int_0^1 \sum_{m=1}^{3}mp_{j,m}t^{m-1}\sum_{n=1}^{3}np_{l,n}t^{n-1}dt$$

$$=\sum_{j=-1}^{2}\sum_{l=-1}^{2}(O_{j+i}\cdot O_{l+i})\sum_{m=1}^{3}\sum_{n=1}^{3}mn p_{j,m}p_{l,n}\int_0^1 t^{m+n-2}dt$$

$$=\sum_{j=-1}^{2}\sum_{l=-1}^{2}(O_{j+i}\cdot O_{l+i})\sum_{m=1}^{3}\sum_{n=1}^{3}\frac{mn}{m+n-1}p_{j,m}p_{l,n}$$

$$=\sum_{j=-1}^{2}O_{j+i}\cdot\sum_{l=-1}^{2}O_{l+i}\sum_{m=1}^{3}mp_{j,m}\sum_{n=1}^{3}\frac{np_{l,n}}{m+n-1}$$

In the sequel, we still use s and Δs to denote their scaled versions. However, s is still not exactly the curve length.

$$E_{11}=\int_0^1 \xi_1(s)\|O(s)\|^2 ds$$

$$=\sum_{i=0}^{K-1}\int_{s_i}^{s_{i+1}}\sum_{m=0}^{M_{1,i}}\xi_{1,i,m}s^m\left\|\sum_{j=-1}^{2}P_j\left(\frac{s-s_i}{\Delta s_i}\right)O_{j+i}\right\|^2 ds$$

$$=\sum_{i=0}^{K-1}\sum_{m=0}^{M_{1,i}}\sum_{j=-1}^{2}\sum_{l=-1}^{2}\int_{s_i}^{s_{i+1}}\xi_{1,i,m}s^m P_j\left(\frac{s-s_i}{\Delta s_i}\right)P_l\left(\frac{s-s_i}{\Delta s_i}\right)O_{j+i}\cdot O_{l+i}ds$$

$$=\sum_{i=0}^{K-1}\sum_{m=0}^{M_{1,i}}\sum_{j=-1}^{2}\sum_{l=-1}^{2}O_{j+i}\cdot O_{l+i}\xi_{1,j,m}\int_0^1 (\Delta s_i\tilde{s}+s_i)^m P_j(\tilde{s})P_l(\tilde{s})\Delta s_i d\tilde{s}$$

$$=\sum_{i=0}^{K-1}\sum_{m=0}^{M_{1,i}}\sum_{j=-1}^{2}\sum_{l=-1}^{2}O_{j+i}\cdot O_{l+i}\xi_{1,j,m}\Delta s_i\int_0^1 \sum_{k=0}^{m}C_m^k(\Delta s_i)^k s_i^{m-k}\tilde{s}^k\sum_{n=0}^{3}p_{j,n}\tilde{s}^n\sum_{q=0}^{3}p_{l,q}\tilde{s}^q d\tilde{s}$$

$$=\sum_{i=0}^{K-1}\sum_{m=0}^{M_{1,i}}\sum_{j=-1}^{2}\sum_{l=-1}^{2}O_{j+i}\cdot O_{l+i}\xi_{1,i,m}\sum_{k=0}^{m}C_m^k(\Delta s_i)^{k+1}s_i^{m-k}\sum_{n=0}^{3}p_{j,n}\sum_{q=0}^{3}p_{l,q}\int_0^1 \tilde{s}^{k+n+q}d\tilde{s}$$

$$=\sum_{i=0}^{K-1}\sum_{j=-1}^{2}O_{j+i}\cdot\sum_{l=-1}^{2}O_{l+i}\sum_{m=0}^{M_{1,i}}\xi_{1,i,m}\sum_{k=0}^{m}C_m^k(\Delta s_i)^{k+1}s_i^{m-k}\sum_{n=0}^{3}p_{j,n}\sum_{q=0}^{3}\frac{p_{l,q}}{k+n+q+1}$$

$$E_{12}(k) = \int_0^1 s^k \xi_1(s) O(s) ds$$

$$= \sum_{i=0}^{K-1} \int_{s_i}^{s_{i+1}} \sum_{m=0}^{M_{1,i}} \xi_{1,i,m} s^{m+k} \sum_{j=-1}^{2} P_j\left(\frac{s-s_i}{\Delta s_i}\right) O_{j+i} ds$$

$$= \sum_{i=0}^{K-1} \sum_{m=0}^{M_{1,i}} \sum_{j=-1}^{2} O_{j+i} \xi_{1,i,m} \int_{s_i}^{s_{i+1}} s^{m+k} P_j\left(\frac{s-s_i}{\Delta s_i}\right) ds$$

$$= \sum_{i=0}^{K-1} \sum_{m=0}^{M_{1,i}} \sum_{j=-1}^{2} O_{j+i} \xi_{1,i,m} \int_0^1 (\Delta s_i \tilde{s} + s_i)^{m+k} P_j(\tilde{s}) \Delta s_i d\tilde{s}$$

$$= \sum_{i=0}^{K-1} \sum_{m=0}^{M_{1,i}} \sum_{j=-1}^{2} O_{j+i} \xi_{1,i,m} \int_0^1 \sum_{n=0}^{m+k} C_{m+k}^n (\Delta s_i)^{n+1} s_i^{m+k-n} \tilde{s}^n \sum_{q=0}^{3} p_{j,q} \tilde{s}^q d\tilde{s}$$

$$= \sum_{i=0}^{K-1} \sum_{m=0}^{M_{1,i}} \sum_{j=-1}^{2} O_{j+i} \xi_{1,i,m} \sum_{n=0}^{m+k} C_{m+k}^n (\Delta s_i)^{n+1} s_i^{m+k-n} \sum_{q=0}^{3} p_{j,q} \int_0^1 \tilde{s}^{n+q} d\tilde{s}$$

$$= \sum_{i=0}^{K-1} \sum_{j=-1}^{2} O_{j+i} \sum_{m=0}^{M_{1,i}} \xi_{1,i,m} \sum_{n=0}^{m+k} C_{m+k}^n (\Delta s_i)^{n+1} s_i^{m+k-n} \sum_{q=0}^{3} \frac{p_{j,q}}{n+q+1}$$

$$E_{13}(k, l) = \int_0^1 \xi_1(s) s^{k+l} ds$$

$$= \sum_{i=0}^{K-1} \int_{s_i}^{s_{i+1}} \sum_{m=0}^{M_{1,i}} \xi_{1,i,m} s^{m+k+l} ds$$

$$= \sum_{i=0}^{K-1} \sum_{m=0}^{M_{1,i}} \frac{\xi_{1,i,m}(s_{i+1}^{m+k+l+1} - s_i^{m+k+l+1})}{m+k+l+1}$$

$$E_{21} = \int_0^1 \xi_2(s) \|O'(s)\|^2 ds$$

$$= \sum_{\substack{i=0 \\ i \notin [K_1, K_2]}}^{K-1} \int_{s_i}^{s_{i+1}} \sum_{m=0}^{M_{2,i}} \xi_{2,i,m} s^m \left\| \sum_{j=-1}^{2} dP_j\left(\frac{s-s_i}{\Delta s_i}\right)/ds O_{j+i} \right\|^2 ds$$

$$= \sum_{\substack{i=0 \\ i \notin [K_1, K_2]}}^{K-1} \sum_{m=0}^{M_{2,i}} \sum_{j=-1}^{2} \sum_{l=-1}^{2} \int_{s_i}^{s_{i+1}} \xi_{2,i,m} s^m P_j'\left(\frac{s-s_i}{\Delta s_i}\right) P_l'\left(\frac{s-s_i}{\Delta s_i}\right) (\Delta s_i)^{-2} O_{j+i} \cdot O_{l+i} ds$$

$$= \sum_{\substack{i=0 \\ i \notin [K_1, K_2]}}^{K-1} \sum_{m=0}^{M_{2,i}} \sum_{j=-1}^{2} \sum_{l=-1}^{2} O_{j+i} \cdot O_{l+i} \xi_{2,i,m} (\Delta s_i)^{-2} \int_0^1 (\Delta s_i \tilde{s} + s_i)^m P_j'(\tilde{s}) P_l'(\tilde{s}) \Delta s_i d\tilde{s}$$

$$= \sum_{\substack{i=0 \\ i \notin [K_1, K_2]}}^{K-1} \sum_{m=0}^{M_{2,i}} \sum_{j=-1}^{2} \sum_{l=-1}^{2} O_{j+i} \cdot O_{l+i} \xi_{2,i,m} (\Delta s_i)^{-1} \int_0^1 \sum_{k=0}^{m} C_m^k (\Delta s_i)^k s_i^{m-k} \tilde{s}^k \sum_{n=1}^{3} np_{j,n} \tilde{s}^{n-1} \sum_{q=1}^{3} qp_{l,q} \tilde{s}^{q-1} d\tilde{s}$$

$$= \sum_{\substack{i=0 \\ i \notin [K_1, K_2]}}^{K-1} \sum_{m=0}^{M_{2,i}} \sum_{j=-1}^{2} \sum_{l=-1}^{2} O_{j+i} \cdot O_{l+i} \xi_{2,i,m} \sum_{k=0}^{m} C_m^k (\Delta s_i)^{k-1} s_i^{m-k} \sum_{n=1}^{3} np_{j,n} \sum_{q=1}^{3} qp_{l,q} \int_0^1 \tilde{s}^{k+n+q-2} d\tilde{s}$$

$$= \sum_{\substack{i=0 \\ i \notin [K_1, K_2]}}^{K-1} \sum_{j=-1}^{2} O_{j+i} \cdot \sum_{l=-1}^{2} O_{l+i} \sum_{m=0}^{M_{2,i}} \xi_{2,i,m} \sum_{k=0}^{m} C_m^k (\Delta s_i)^{k-1} s_i^{m-k} \sum_{n=1}^{3} np_{j,n} \sum_{q=1}^{3} \frac{qp_{l,q}}{k+n+q-1}$$

$$E_{22}(k) = \int_0^1 ks^{k-1} \xi_2(s) O'(s) ds$$

-continued $$= k \sum_{\substack{i=0 \\ i \notin [K_1, K_2]}}^{K-1} \int_{s_i}^{s_{i+1}} \sum_{m=0}^{M_{2,i}} \xi_{2,i,m} s^{m+k-1} \sum_{j=-1}^{2} dP_j\left(\frac{s-s_i}{\Delta s_i}\right)/ds O_{j+i} ds$$

$$= k \sum_{\substack{i=0 \\ i \notin [K_1, K_2]}}^{K-1} \sum_{m=0}^{M_{2,i}} \sum_{j=-1}^{2} O_{j+i} \xi_{2,i,m} \int_{s_i}^{s_{i+1}} s^{m+k-1} (\Delta s_i)^{-1} P'_j\left(\frac{s-s_i}{\Delta s_i}\right) ds$$

$$= k \sum_{\substack{i=0 \\ i \notin [K_1, K_2]}}^{K-1} \sum_{m=0}^{M_{2,i}} \sum_{j=-1}^{2} O_{j+i} \xi_{2,i,m} (\Delta s_i)^{-1} \int_0^1 (\Delta s_i \tilde{s} + s_i)^{m+k-1} P'_j(\tilde{s}) \Delta s_i d\tilde{s}$$

$$= k \sum_{\substack{i=0 \\ i \notin [K_1, K_2]}}^{K-1} \sum_{m=0}^{M_{2,i}} \sum_{j=-1}^{2} O_{j+i} \xi_{2,i,m} \int_0^1 \sum_{n=0}^{m+k-1} C_{m+k-1}^n (\Delta s_i)^n s_i^{m+k-n-1} \tilde{s}^n \sum_{q=1}^{3} q p_{j,q} \tilde{s}^{q-1} d\tilde{s}$$

$$= k \sum_{\substack{i=0 \\ i \notin [K_1, K_2]}}^{K-1} \sum_{m=0}^{M_{2,i}} \sum_{j=-1}^{2} O_{j+i} \xi_{2,i,m} \sum_{n=0}^{m+k-1} C_{m+k-1}^n (\Delta s_i)^n s_i^{m+k-n-1} \sum_{q=1}^{3} q p_{j,q} \int_0^1 \tilde{s}^{n+q-1} d\tilde{s}$$

$$= k \sum_{\substack{i=0 \\ i \notin [K_1, K_2]}}^{K-1} \sum_{j=-1}^{2} O_{j+i} \sum_{m=0}^{M_{2,i}} \xi_{2,i,m} \sum_{n=0}^{m+k-1} C_{m+k-1}^n (\Delta s_i)^n s_i^{m+k-n-1} \sum_{q=1}^{3} \frac{q p_{j,q}}{n+q}$$

$$E_{23}(k, l) = \int_0^1 k l \xi_2(s) s^{k+l-2} ds$$

$$= k l \sum_{i=0}^{K-1} \int_{s_i}^{s_{i+1}} \sum_{m=0}^{M_{2,i}} \xi_{2,i,m} s^{m+k+l-2} ds$$

$$= k l \sum_{i=0}^{K-1} \sum_{m=0}^{M_{2,i}} \frac{\xi_{2,i,m}(s_{i+1}^{m+k+l-1} - s_i^{m+k+l-1})}{m+k+l-1}$$

There is $i \notin [K_1, K_2]$ because the control points on the line segment linking the ending and starting points are not taken into account.

$$E_{33}(k, l) = \int_0^1 k(k-1)l(l-1) \xi_3(s) s^{k+l-4} ds$$

$$= k(k-1)l(l-1) \sum_{i=0}^{K-1} \int_{s_i}^{s_{i+1}} \sum_{m=0}^{M_{3,i}} \xi_{3,i,m} s^{m+k+l-4} ds$$

$$= k(k-1)l(l-1) \sum_{i=0}^{K-1} \sum_{m=0}^{M_{3,i}} \frac{\xi_{3,i,m}(s_{i+1}^{m+k+l-3} - s_i^{m+k+l-3})}{m+k+l-3}$$

Figure 10A:
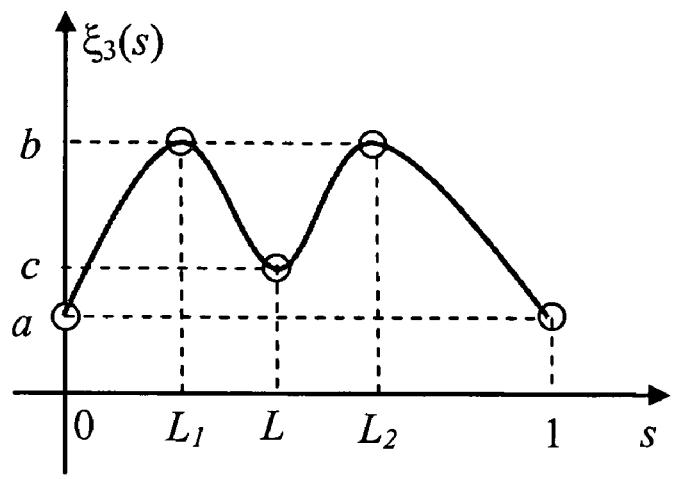
FIG. 10 shows graphs representing characteristics of the weighting functions according to one embodiment of the invention.

In order to ensure the smoothness at $L_1$ and $L_2$, $\xi_3(s)$ should have peaks around $L_1$ and $L_2$ (shown in FIG. 10a). Intuitively $L$ should satisfy:

$$\frac{L - L_1}{L_1} = \frac{L_2 - L}{1 - L_2}, \text{ or}$$

$$L = \frac{L_1}{1 + L_1 - L_2}.$$

-continued $$E_{11} = \int_0^1 \xi_1(s) \|O(s)\|^2 ds$$

$$= \sum_{i=0}^{K-1} \int_{s_i}^{s_{i+1}} \sum_{m=0}^{M_{1,i}} \xi_{1,i,m} s^m \left\| \sum_{j=-1}^{2} P_j\left(\frac{s-s_i}{\Delta s_i}\right) O_{j+i} \right\|^2 ds$$

$$= \sum_{i=0}^{K-1} \sum_{m=0}^{M_{1,i}} \sum_{j=-1}^{2} \sum_{l=-1}^{2} \int_{s_i}^{s_{i+1}} \xi_{1,i,m} s^m P_j\left(\frac{s-s_i}{\Delta s_i}\right) P_l\left(\frac{s-s_i}{\Delta s_i}\right) O_{j+i} \cdot O_{l+i} ds$$

$$= \sum_{i=0}^{K-1} \sum_{m=0}^{M_{1,i}} \sum_{j=-1}^{2} \sum_{l=-1}^{2} O_{j+i} \cdot O_{l+i} \xi_{1,i,m} \int_0^1 (\Delta s_i \tilde{s} + s_i)^m P_j(\tilde{s}) P_l(\tilde{s}) \Delta s_i d\tilde{s}$$

$$= \sum_{i=0}^{K-1} \sum_{m=0}^{M_{1,i}} \sum_{j=-1}^{2} \sum_{l=-1}^{2} O_{j+i} \cdot O_{l+i} \xi_{1,i,m} \Delta s_i \int_0^1$$

Let $\xi_3(s)$ be a piece-wise polynomial that satisfies the following condition:

$$\xi_3(0) = a, \quad \xi_3(1) = a, \tag{2}$$

$$\xi_3(L_1) = b, \quad \xi_3(L) = c, \quad \xi_3(L_2) = b, \tag{3}$$
$$\xi_3'(L_1) = 0, \quad \xi_3'(L) = 0, \quad \xi_3'(L_2) = 0,$$

Then $$\xi_3(s) = \begin{cases} \dfrac{a-b}{L_1^2}s^2 - \dfrac{2(a-b)}{L_1}s + a, & 0 \le s \le L_1, \\ \tilde{\xi}_{3,3}s^3 - \dfrac{3}{2}(L_1+L)\tilde{\xi}_{3,3}s^2 + 3L_1 L\tilde{\xi}_{3,3}s + \left[c - \dfrac{1}{2}L^2(3L_1-L)\tilde{\xi}_{3,3}\right], & L_1 \le s \le L, \\ \hat{\xi}_{3,3}s^3 - \dfrac{3}{2}(L_2+L)\tilde{\xi}_{3,3}s^2 + 3L_2 L\tilde{\xi}_{3,3}s + \left[c - \dfrac{1}{2}L^2(3L_2-L)\tilde{\xi}_{3,3}\right], & L \le s \le L_2, \\ \dfrac{a-b}{(1-L_2)^2}s^2 - \dfrac{2(a-b)L_2}{(1-L_2)^2}s + \left(a - \dfrac{(a-b)(1-2L_2)}{(1-L_2)^2}\right), & L_2 \le s \le 1. \end{cases}$$

where $$\tilde{\xi}_{3,3} = -\dfrac{b-c}{(L_1-L)\left[(2L_1^2 - L_1 L - L^2) - \dfrac{3}{2}(L_1^2 - L^2)\right]},$$

$$\hat{\xi}_{3,3} = -\dfrac{b-c}{(L_2-L)\left[(2L_2^2 - L_2 L - L^2) - \dfrac{3}{2}(L_2^2 - L^2)\right]}.$$

This gives the coefficients $\xi_{3,i,m}$.

Figure 10B:
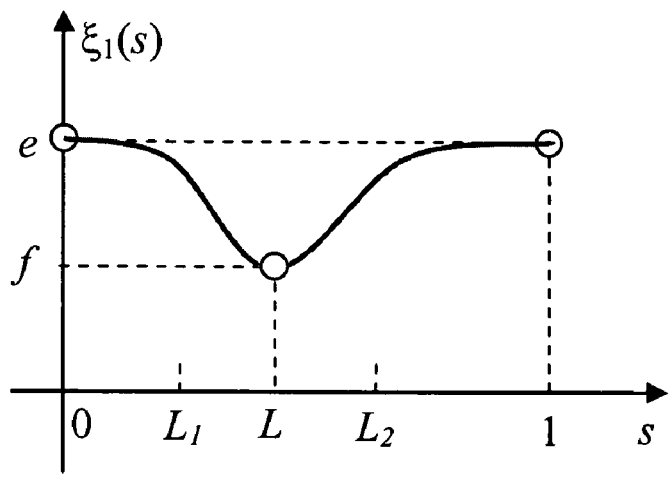

$\xi_1(s)$ should look substantially similar to the graph shown in FIG. 10b. Let $\xi_1(s)$ be a piece-wise polynomial that satisfies the following condition:

$$\xi_1(0) = e, \quad \xi_1(L) = f, \quad \xi_1(1) = e, \tag{4}$$
$$\xi_1'(0) = 0, \quad \xi_1'(L) = 0, \quad \xi_1'(1) = 0,$$

then $$\xi_1(s) = \begin{cases} \tilde{\xi}_{1,3}s^3 - \dfrac{3}{2}L\tilde{\xi}_{1,3}s^2 + \left(c + \dfrac{1}{2}L^3\tilde{\xi}_{1,3}\right), & 0 \le s \le L, \\ \hat{\xi}_{1,3}s^3 - \dfrac{3}{2}(1+L)\hat{\xi}_{1,3}s^2 + 3L\hat{\xi}_{1,3}s + \left[c - \dfrac{1}{2}L^2(3-L)\hat{\xi}_{1,3}\right] & L \le s \le 1. \end{cases}$$

where $$\tilde{\xi}_{1,3} = 2(e-f)L^{-3}, \quad \hat{\xi}_{1,3} = -2(e-f)(1-L)^{-3}.$$

This gives the coefficients $\xi_{1,i,m}$.

In select embodiments, pen pressure may be assigned to the connection part. Usually, under normal writing conditions, pen pressure at the connection part is smaller than that in the main body of the character and changes throughout the connecting process. Step 635 may be initiated to assign such pen pressure. In addition to reducing pressure at certain points of the connection part, pressure may also be increased at other points. Indeed, any part of the character and/or connection segment may be assigned a pen pressure value. Illustrating the variance in pen pressure in the connection part can greatly improve the visual quality of synthesized handwriting. The method to assign pen pressure to the connection part can be described below.

Assume that there are m points on the connection-piece (heading and tailing parts), and $P_1, \ldots, P_m$ are their pressure values, and after the final connection curve is generated, there are n points on the new connection-piece. Then for each point on the final connection curve, the value of pressure can be computed with the equation: $\tilde{P}_i = P_k$, where k is the integer part of i/n*m, i=1, ..., n. The step may render the low-pressure part with small width and high-pressure part with large width.

In yet further embodiments of the invention, the user may utilize aspects of the invention in computing environments where the handwriting output will be displayed in a multi-lined format, such as this paragraph. Therefore, step 640 may be implemented to choose the appropriate inter-line spacing. In most people's handwriting, the top of the second line meets the bottom of the first line, so one embodiment may determine the spacing as follows:

$$d = H_{capital\_letters} + H_{descendent\_letters} - H_{middle\_zone\_letters} + \Delta h$$

where $H_{Capital\_letters}$, $H_{descendent\_letters}$ and $H_{middle\_zone\_letters}$ are the average heights of all capital letters, all descendent letters, and middle-zone letters, respectively, and $\Delta h$ is a predefined value. In one embodiment, the Applicant's have determined a value of 3 to be an acceptable $\Delta h$.

The present invention has been described in terms of exemplary embodiments. Numerous other embodiments, modifications and variations within the scope and spirit of the appended claims will occur to persons of ordinary skill in the art from a review of this disclosure. For example, one skilled in the art will realize that additional or less steps may be implemented to display and associate the user tiles of the present invention. Moreover, while the exemplary embodiments illustrate the use of user tiles in a PC environment, the invention, however, may be configured for personal gaming systems, such as Sony® Playstation® or Microsoft® Xbox®, handheld systems such as a Palm® or Treo®, among others, for example, cellular-based applications. In still yet further embodiments, the invention is configured for web-based applications that may be incorporated within or independent of cellular-based applications.

We claim:

1. A computer-implemented method of facilitating training of a computer to recognize a computer user's handwriting comprising the steps of:
   (a) receiving, by a computing system configured to facilitate computer recognition of user's handwriting, handwriting samples of at least one character written by the user, the samples comprising at least one sample of the character being provided as the beginning character among a plurality of other characters, at least one sample of the character being provided in the middle of a plurality of other of characters, and at least one sample of the letter being provided as the ending character among a plurality of characters;
   (b) extracting, by the computing system, a plurality of control points from the samples, wherein the control points represent the shape of the character;
   (c) determining, by the computing system, the vertical position of the character in relation to a baseline comprising the step of determining the distance from the bottom of the character to a baseline; and
   (d) normalizing, by the computing system, the at least one sample of at least one character.

2. The computer-implemented method of claim 1, wherein the at least one character is a plurality of characters arranged in a word-type arrangement, the method further comprising the steps of
   (e) determining, by the computing system, the average horizontal distance between the central axis of at least two characters arranged in the word-type arrangement.

3. The computer-implemented method of claim 1, wherein the at least one character is a plurality of characters arranged in a word-type arrangement, the method further comprising the steps of
   (e) determining, by the computing system, a connection inclination of at least two successive characters in the word-type arrangement.

4. The computer-implemented method of claim 3, wherein the connection inclination is calculated according to:

$$P_{user} = \frac{1}{m}\sum_{i=1}^{m} p^{i}_{user},$$

wherein
$P^{i}_{user}$ represents a connection inclination for a i-th word;
m represents a number of m words;
$P_{user}$ represents the connection inclination of the user.

5. The computer-implemented method of claim 1, further comprising the steps of:
   (e) determining, by the computing system, the sample comprises a character that is a multi-stroke letter that requires a plurality of user strokes when written;
   (f) presenting, by the computing system, a graphical user interface that displays the multi-stroke character of step (e) with a different character that requires a single user stroke, wherein the graphical user interface is presented to the user to indicate the user should provide an input in the form of a handwriting sample that connects the multi-stroke letter with the single stroke character;
   (g) receiving, by the computing system, an input from the user in the form of a handwriting sample; and
   (h) determining, by the computing system, how the multi-stroke letter of step (e) is connected to other letters.

6. The computer-implemented method of claim 1, further comprising the step of:
   (e) prior to normalization, categorizing, by the computing system, at least one character into a group selected from the group consisting of:
   ascenders, descenders, middle zone, multi-zone, and equivalents thereof.

7. The computer-implemented step of claim 1, further comprising the step of:
   (e) determining, by the computing system, the amount of pressure the user applies while inputting the handwriting sample in step (a).

8. The computer-implemented method of claim 1, wherein the character is an alphanumeric character.

9. The computer-implemented method of claim 8, wherein the character is provided in lower case format.

10. The computer-implemented method of claim 1, wherein step (c) comprises the step of determining, by the computing system, the ratio of (1) the distance from the bottom of the character to a baseline to (2) the overall height of the character.

11. A computer-implemented method of displaying a representation of a computer user's handwriting on a display device comprising the steps of:
    (a) receiving a user input through a user input device comprising a plurality of characters;
    (b) determining whether at least two characters received in the user input should be joined;
    (c) for each character, selecting a sample among a plurality of samples stored on a computer-readable medium to represent the character, wherein the plurality of samples comprises at least one sample of the character being provided as the beginning character among a plurality of other characters, at least one sample of the character being provided in the middle of a plurality of other of characters, and at least one sample of the letter being provided as the ending character among a plurality of characters, wherein the selected sample comprises at least one segment selected from the group consisting of a heading segment, a tailing segment, and a central axis;
    (d) determining a horizontal distance between the central axis of at least two of the samples, wherein the horizontal distance between one sample may be a different distance than the horizontal distance between another sample;
    (e) for at least two characters determined to be connected in step (b), adjusting at least a portion of a tailing segment of at least one character and at least a portion of the heading segment of at least one character;
    (f) joining the at least two characters of step (e); and
    (g) displaying the at least two characters on a display device, the at least two characters being a representation of the characters received in step (a) in the form of the user's handwriting.

12. The computer-implemented method of claim 11, wherein step (f) includes the use of a connection segment to connect the tailing segment of a first character to the heading segment of a second character.

13. The computer-implemented method of claim 12, wherein the connection segment is shaped according to a 3-order polynomial that considers the closeness of old and new connection parts, the bending energy, and the smoothness of the connection.

14. The computer-implemented method of claim 13, wherein the polynomial that minimizes a whole energy to be used is a final connection piece.

15. The computer-implemented method of claim 11, further comprising the step of:
   (h) applying a geometric variation of at least one of the samples for the characters selected in (c), wherein the geometric variation comprises a process selected from the group consisting of: scaling and rotation of at least a portion of the sample.

16. The computer-implemented method of claim 11, further comprising the step of:
   (h) calculating a value of pressure to be applied to at least a portion of a segment of a character.

17. The computer-implemented method of claim 16, where the value of pressure is calculated with the equation $\tilde{p}_i = p_k$, where k is the integer part of $i/n*m$, $i=1, \ldots, n$;
   wherein:
   m represents m points on a connection piece;
   $p_1, \ldots, p_m$ represents their pressure values;
   n represents that, after a final connection curve is generated, there are n points on a new connection;
   $\tilde{p}_i$ represents the value of pressure for each point on the final connection curve.

18. The computer-implemented method of claim 11, wherein the representation of the user's handwriting is displayed on more than one line, further comprising the step of:
   (h) determining the interline spacing between the lines of handwriting with the equation $d = H_{capital\_letters} + H_{descendent\_letters} - H_{middle\_zone\_letters} + \Delta$,
   where $H_{Capital\_letters}$, $H_{descendent\_letters}$, and $H_{middle\_zone\_letters}$ are the average heights of all capital letters, all descendent letters, and middle-zone letters, respectively, and $\Delta h$ is a predefined value.

19. In a computer system having a graphical user interface including a display and a user interface input device, a method of configuring a computer to facilitate computer recognition of a user's handwriting comprising the steps of:
   (a) displaying on the display device at least one input field for receiving a user input in the form of handwritten sample characters, wherein the handwritten sample characters comprises at least one sample of the character being provided as the beginning character among a plurality of other characters, at least one sample of the character being provided as being the middle of a plurality of other of characters, and at least one sample of the letter being provided as the ending character among a plurality of characters;
   (b) receiving an input signal indicative of the user interface input device providing at least one sample character comprising at least one segment selected from the group consisting of a heading segment, a tailing segment, and a central axis;
   (c) based upon the signal, assigning the received sample character to be the representative character for a subcategory selected from the group consisting of: the beginning character among a plurality of other characters, the character being provided as middle character among a plurality of other of characters, and the ending character among a plurality of characters, wherein the selected sample comprises at least one segment selected from the group consisting of a heading segment, a tailing segment, and a central axis; and
   (d) normalizing the representative character; and
   (e) storing the assigned, normalized character on a computer readable medium.

20. The method of claim 19, the system further comprising a second user interface input device, the method further comprising the steps of:
   (f) receiving a input signal indicative of the second user interface input device providing at least two characters;
   (g) determine whether to join the at least two characters received of step (e);
   (h) selecting a representative character among a plurality of representative characters stored on the computer-readable medium to represent each of the characters received in step (f), wherein the plurality of characters comprise at least one sample of the character being provided as the beginning character among a plurality of other characters, at least one sample of the character being provided in the middle of a plurality of other of characters, and at least one sample of the letter being provided as the ending character among a plurality of characters;
   (i) performing geometric variation on at least one of the selected characters; and
   (j) displaying the at least two characters on a display device, the at least two characters being a representation of the characters received in step (f), wherein the characters are displayed in the form of the user's handwriting.

* * * * *